(12) United States Patent
Takai et al.

(10) Patent No.: US 7,880,376 B2
(45) Date of Patent: Feb. 1, 2011

(54) FIELD EMISSION DEVICES MADE WITH LASER AND/OR PLASMA TREATED CARBON NANOTUBE MATS, FILMS OR INKS

(75) Inventors: Mikio Takai, Takarazuka (JP); Alan Fischer, Cambridge, MA (US); Lein Ngaw, Lowell, MA (US); Chunming Niu, Palo Alto, CA (US)

(73) Assignee: Hyperion Catalysis International, Inc., Cambridge, MA (US)

( * ) Notice: Subject to any disclaimer, the term of this patent is extended or adjusted under 35 U.S.C. 154(b) by 0 days.

(21) Appl. No.: 11/841,761

(22) Filed: Aug. 20, 2007

(65) Prior Publication Data

US 2008/0093968 A1    Apr. 24, 2008

Related U.S. Application Data

(60) Division of application No. 10/888,942, filed on Jul. 9, 2004, now Pat. No. 7,341,498, which is a continuation-in-part of application No. PCT/US03/19068, filed on Jun. 16, 2003, and a continuation-in-part of application No. 10/171,760, filed on Jun. 14, 2002, now abandoned, and a continuation-in-part of application No. 10/171,773, filed on Jun. 14, 2002, now Pat. No. 6,911,767.

(60) Provisional application No. 60/485,918, filed on Jul. 9, 2003, provisional application No. 60/388,616, filed on Jun. 14, 2002, provisional application No. 60/298,193, filed on Jun. 14, 2001, provisional application No. 60/298,228, filed on Jun. 14, 2001.

(51) Int. Cl.
*H01J 1/62* (2006.01)

(52) U.S. Cl. .................... 313/495; 313/310
(58) Field of Classification Search ........ 313/495–497, 313/310; 445/49–51
See application file for complete search history.

(56) References Cited

U.S. PATENT DOCUMENTS

| 4,663,230 A | 5/1987 | Tennent |
| 4,855,091 A * | 8/1989 | Geus et al. .................. 264/437 |
| 5,110,693 A | 5/1992 | Friend et al. |
| 5,165,909 A | 11/1992 | Tennent et al. |
| 5,171,560 A | 12/1992 | Tennent |

(Continued)

FOREIGN PATENT DOCUMENTS

CA    2315132    2/2001

(Continued)

OTHER PUBLICATIONS

Carey, J.D., et al., "Origin of Electric Field Enhancement in Field Emission from Amorphous Carbon Thin Films," 78 Applied Physics Letters 2339 (2001).

(Continued)

*Primary Examiner*—Bumsuk Won

(57) ABSTRACT

Field emission devices comprising carbon nanotube mats which have been treated with laser or plasma are provided. Mats are formed from carbon nanotubes, also known as carbon fibrils, which are vermicular carbon deposits having diameters of less than about one micron. The carbon nanotube mats are then subjected to laser or plasma treatment. The treated carbon nanotube mat results in improved field emission performance as either a field emission cathode or as part of a field emission device.

14 Claims, 18 Drawing Sheets

ELECTROPHORESIS / DEPOSITION

SOLUTION
  CNT 0.44 g
  IPA 150 ml
ELECTRODE
  Al (9 mm x 9mm) x 3
VOLTAGE
  DC 100 V
CURRENT
  3.8 mA
TIME 30 min

U.S. PATENT DOCUMENTS

| | | | |
|---|---|---|---|
| 5,691,054 | A | 11/1997 | Tennent et al. |
| 5,889,372 | A | 3/1999 | Beeteson et al. |
| 5,891,548 | A | 4/1999 | Graiver et al. |
| 6,031,711 | A * | 2/2000 | Tennent et al. ............. 361/303 |
| 6,087,765 | A | 7/2000 | Coll et al. |
| 6,099,965 | A | 8/2000 | Tennent et al. |
| 6,129,901 | A | 10/2000 | Moskovits et al. |
| 6,239,547 | B1 | 5/2001 | Uemura et al. |
| 6,538,367 | B1 * | 3/2003 | Choi et al. ................. 313/309 |
| 6,911,767 | B2 * | 6/2005 | Takai .......................... 313/311 |
| 2001/0001681 | A1 * | 5/2001 | Zhang et al. ................ 427/508 |
| 2001/0021534 | A1 * | 9/2001 | Wohlstadter et al. ........ 436/518 |
| 2001/0024078 | A1 | 9/2001 | Dimitrijevic et al. |
| 2002/0086212 | A1 * | 7/2002 | Nordlinder et al. ....... 429/231.5 |
| 2002/0145132 | A1 | 10/2002 | Won et al. |
| 2003/0090190 | A1 | 5/2003 | Takai et al. |
| 2005/0116602 | A1 | 6/2005 | Iijima et al. |

FOREIGN PATENT DOCUMENTS

| | | |
|---|---|---|
| CN | 1349241 A | 2/2002 |
| CN | 1424250 A | 6/2003 |
| EP | 0 989 579 A2 | 3/2000 |
| EP | 1 020 888 A1 | 7/2000 |
| EP | 1 022 763 A1 | 7/2000 |
| EP | 1 022 764 A1 | 7/2000 |
| EP | 1 046 613 A2 | 10/2000 |
| EP | 1 059 266 A2 | 12/2000 |
| EP | 1 059 266 A3 | 12/2000 |
| EP | 1 061 040 A1 | 12/2000 |
| EP | 1 061 041 A1 | 12/2000 |
| EP | 1 061 043 A1 | 12/2000 |
| EP | 1 061 544 A1 | 12/2000 |
| EP | 1 073 090 A2 | 1/2001 |
| EP | 0 989 579 A3 | 3/2001 |
| GB | 2 353 138 A | 2/2001 |
| WO | 9906618 A1 | 2/1999 |
| WO | WO 99/65821 | 12/1999 |
| WO | 0026138 A1 | 5/2000 |
| WO | WO 00/30141 | 5/2000 |
| WO | WO 00/40508 | 7/2000 |
| WO | WO 00/63115 | 10/2000 |
| WO | WO 00/73203 A1 | 12/2000 |
| WO | WO 00/73204 A1 | 12/2000 |
| WO | WO 00/76912 A2 | 12/2000 |
| WO | WO 01/08193 A1 | 2/2001 |
| WO | WO 01/09914 A1 | 2/2001 |
| WO | WO 01/23303 A1 | 4/2001 |
| WO | 03107359 A1 | 12/2003 |

OTHER PUBLICATIONS

Dean, K. A., et al., "Current Saturation Mechanisms in Carbon Nanotube Field Emitters," Applied Physics Letters 76:375-377 (2000).

Dimitrijevic, S., et al., "Electron Emission from Films of Carbon Nanotubes and ta-C Coated Nanotubes," Applied Physics Letters 75:2680-2682 (1999).

Guo, T., et al., "Catalytic growth of single-walled nanotubes by laser vaporization," Chem. Phys. Lett., vol. 243: Issues 1-2, pp. 49-54 (1995).

Journet et al., "Large-scale production of single-walled carbon nanotubes by the electric-arc technique," Nature 388:756-758 (1997).

Khan, R., et al., "Electron Delocalization in Amorphous Carbon by Ion Implantation," Physical Review B, vol. 63, pp. 121201-1-121201-4 (2001).

Nilsson, L., et al., "Carbon Nano-/Micro-Structures in Field Emission: Environmental Stability and Field Enhancement Distribution," Thin Solid Films 383:78-80 (2001).

Saito, Yahachi, et al., "Cathode Ray Tube Lighting Elements with Carbon Nanotube Field Emitters," Japan. J. Applied Physics, vol. 37, pp. L346-L348 (1998).

Saito, Yahachi, et al., "Field Emission from Multi-Walled Carbon Nanotubes and its Application to Electron Tubes," Applied Physics, vol. 67, pp. 95-100 (1998).

Seidl, A., et al., "Geometry Effects Arising from Anodization of Field Emitters," J. Vac. Sci. Technol. B, 18(2):929-932 (2000).

Takai, M., et al., "Effect of Laser Irradiation on Electron Emission from Si Field Emitter Arrays," J. Vac. Sci. Technol. B., 16(2):780-782 (1998).

Takai, M., et al., "Electron Emission from Gated Silicide Field Emitter Arrays," J. Vac. Sci. Technol. B, 16(2):790-792 (1998).

Takai, M., et al., "Effect of Gas Ambient on Improvement in Emission Behavior of Si Field Emitter Arrays," J. Vac. Sci. Technol B., 16(2):799-802 (1998).

Thess, A., et al., "Crystalline Ropes of Metallic Carbon Nanotubes," Science, 273:483-487 (1996).

Vigolo. et al., "Carbon Nanotubes Macroscopic Fibers and Ribbons of Oriented Science," Science 290:1331-1334 (2000).

Wadhawan, A., et al., "Effects of Cs Deposition on the Field-Emission Properties of Single-Walled Carbon-Nanotube Bundles," Applied Physics Letters 78 :108-110 (2001).

Walter, K. C., et al., "Improved Field Emission of Electrons from Ion Irradiated Carbon," Applied Physics Letters 71:1320-1322 (1997).

Yavas, O., et al., "Improvement of Electron Emission of Silicon Field Emitter Arrays by Pulsed Laser Cleaning," J. Vac. Sci. Technol. B. 18(2):1081-1084 (2000).

Yavas, O., et al., "Laser Cleaning of Field Emitter Arrays for Enhanced Electron Emission," Applied Physics Letters 72:2797-2799 (1998).

Yavas, O., et al., "Field Emitter Array Fabricated Using Focused Ion and Electron Beam Induced Reaction," J. Vac. Sci. Technol B. 18(2):976-979 (2000).

Yavas, O., et al., "Maskless Fabrication of Field-Emitter Array by Focused Ion and Electron Beam," Applied Physics Letters 76:3319-3321 (2000).

Yavas, O., et al., "Pulsed Laser Deposition of Diamond Like Carbon Films on Gated Si Field Emitter Arrays for Improved Electron Emission," Japan. J. Applied Physics 38:7208-7212 (1999).

Zhu, W., et al., "Low-Field Electron Emission from Undoped Nanostructured Diamond," Science 282:1471-1473 (1998).

* cited by examiner

FIG. 3: SEM IMAGE OF CARBON NANOTUBES:
(A) BEFORE PLASMA TREATMENT.
(B) AFTER PLASMA TREATMENT FOR 3 MIN.

TOP (3,500x)

BOTTOM (3,500)

TOP (BEFORE LASER IRRAD.)

TOP (AFTER LASER IRRAD.)

FIELD EMISSION DEVICES MADE WITH LASER AND/OR PLASMA TREATED CARBON NANOTUBE MATS, FILMS OR INKS

RELATED APPLICATIONS

This is a divisional of U.S. Ser. No. 10/888,942 filed Jul. 9, 2004 now U.S. Pat. No. 7,341,498, which claims the benefit of U.S. Provisional Application No. 60/485,918, filed Jul. 9, 2003. This application is also a divisional of U.S. Ser. No. 10/888,942, which is also a continuation in part of PCT/US03/19068 filed Jun. 16, 2003, which claims benefit to the U.S. Provisional Application No. 60/388,616, filed Jun. 14, 2002. This application is also a divisional of U.S. Ser. No. 10/888,942, which is also a continuation in part of U.S. Ser. No. 10/171,760, filed Jun. 14, 2002, abandoned, which claims benefit to the U.S. Provisional Application No. 60/298,193, filed Jun. 14, 2001. This application is also a divisional of U.S. Ser. No. 10/888,942, which is also a continuation in part of U.S. Ser. No. 10/171,773, filed Jun. 14, 2002, now U.S. Pat. No. 6,911,767, issued Jun. 28, 2005, which claims benefit to U.S. Provisional Application No. 60/298,228, filed Jun. 14, 2001. All of these applications are hereby incorporated by reference in their entirety.

TECHNICAL FIELD

The present invention relates to field emission devices or field emission cathodes made from or with carbon nanotube mats, films, or inks that have been laser or plasma treated.

BACKGROUND

Field Emission Devices

Field emission devices are devices that capitalize on the movement of electrons. A typical field emission device includes at least a cathode, emitter tips, and an anode spaced from the cathode. A voltage is applied between the cathode and the anode causing electrons to be emitted from the emitter tips. The electrons travel in the direction from the cathode to the anode. These devices can be used in a variety of applications including, but not limited to, microwave vacuum tube devices, power amplifiers, ion guns, high energy accelerators, free electron lasers, and electron microscopes, and in particular, flat panel displays. Flat panel displays can be used as replacements for conventional cathode ray tubes. Thus, they have applications in television and computer monitors.

Conventional emitter tips are made of metal, such as molybdenum, or a semiconductor such as silicon. The problem with metal emitter tips is that the control voltage required for emission is relatively high, e.g., around 100 V. Moreover, these emitter tips lack uniformity resulting in non-uniform current density between pixels.

More recently, carbon materials, have been used as emitter tips. Diamond has negative or low electron affinity on its hydrogen-terminated surfaces. Diamond tips, however, have a tendency for graphitization at increased emission currents, especially at currents about thirty $mA/cm^2$. Carbon nanotubes, also known as carbon fibrils, have been the latest advancement in emitter tip technology. Although much work has been done in the area of carbon nanotubes as emitter tips in field emitting technologies, substantial improvement is still needed in at least three areas. These are reducing the working voltage (specific to the particular application), reducing the "turn-on" voltage, increasing emission current density, and increasing the number of emission sites. Reducing the "turn-on" voltage (and the working voltage) tends to increase the ease of electron emission and increase the longevity of the emitter tips. Increasing both the emission current and the number of emission sites increases the brightness. An increased number of emission sites will likely result in a more homogeneous emission across a given area or volume.

Carbon Nanotubes

Carbon nanotubes (CNTs) are vermicular carbon deposits having diameters of less than about one micron. They exist in a variety of forms, and have been prepared through the catalytic decomposition of various carbon-containing gases at metal surfaces, by high temperature carbon arc processes, where solid carbon is used as the carbon feed stock, and by simultaneous laser vaporization of graphite rods and a transition metal. Tennent, U.S. Pat. No. 4,663,230, succeeded in growing small diameter nanotubes having cylindrical ordered graphite cores and an ordered "as grown" graphitic surface uncontaminated with pyrolytic carbon. Tennent, describes carbon nanotubes that are free of a continuous thermal carbon overcoat and have multiple graphitic outer layers that are substantially parallel to the fibril axis. As such they may be characterized as having their c-axes, the axes which are perpendicular to the tangents of the curved layers of graphite, substantially perpendicular to their cylindrical axes. They generally have diameters no greater than 0.1 micron and length to diameter ratios of at least five. Such nanotubes having graphitic layers that are substantially parallel to the fibril axis and diameters between 3.5 and 75 nanometers, are described in Tennent et al., U.S. Pat. No. 5,165,909 and Tennent et al, U.S. Pat. No. 5,171,560, both of which are herein incorporated by reference.

The graphitic planes may also be oriented at an angle to the fibril axis. Such structures are often called "fishbone" fibrils or nanotubes because of the appearance of the two dimensional projection of the planes. Such morphologies and methods for their production are discussed in U.S. Pat. No. 4,855,091 to Geus, herein incorporated by reference. Fishbone fibrils are typically 10 to 500 nm in diameter, preferably from 50 to 200 nm and have aspect ratios between 10 and 1000.

Macroscopic assemblages and composites consisting of multiwall nanotubes have been described in Tennent et al, U.S. Pat. No. 5,691,054, herein incorporated by reference. Such assemblages and composites are composed of randomly oriented carbon fibrils having relatively uniform physical properties in at least two dimensions. Such macroscopic assemblages are differentiated from "as-made" aggregates by the ability to form them at any desired size. Preferably such aggregates have at least one dimension greater than 1 mm and preferably greater than 1 cm. Such assemblages may take the form of a two dimensionally isentropic mat or felt.

The carbon nanotubes disclosed in U.S. Pat. Nos. 4,663,230, 5,165,909, and 5,171,560, may have diameters that range from about 3.5 nm to 70 nm and lengths greater than 100 times the diameters, an outer region of multiple essentially continuous layers of ordered carbon atoms and a distinct inner core region. Furthermore, these multiwall nanotubes are substantially free of pyrolytically deposited carbon. All of these references are herein incorporated by reference.

As disclosed in U.S. Pat. No. 5,110,693 and references therein (all of which are herein incorporated by reference), two or more individual carbon fibrils may form microscopic aggregates of entangled fibrils. Simply for illustrative purposes, one type of microscopic aggregate ("cotton candy or CC") resembles a spindle or rod of entangled fibers with a diameter that may range from 5 nm to 20 nm with a length that may range from 0.1 μm to 1000 μm. Again for illustrative purposes, another type of microscopic aggregate of fibrils ("birds nest, or BN") can be roughly spherical with a diameter that may range from 0.1 μm to 1000 μm. Larger aggregates of each type (CC and/or BN) or mixtures of each can be formed.

Carbon nanotubes having a single wall comprising a single graphene sheet have been produced. These single wall carbon nanotubes have been described in Bethune et al., U.S. Pat. No. 5,424,054; Guo, et al., Chem. Physics Lett., 243:1-12 (1995); Thess, et al, Science, 273:483-487 (1996); Journet et al., Nature 388 (1997) 756; Vigolo, et al., Science 290 (2000) 1331. They are also described in U.S. patent application Ser. No. 08/687,665, entitled "Ropes of Single-Walled Carbon Nanotubes" herein incorporated by reference. Single wall nanotubes may be prepared by a variety of procedures. These may use a solid phase carbon source which is vaporized by an arc or by a laser. Alternatively, and preferably, single wall nanotubes are made catalytically from gas phase carbon precursors. There are two broad methods of such catalytic synthesis: so-called aerosol or floating catalyst processes using a gas phase catalyst precursor which is decomposed to catalytic species in the reaction zone and processes using a classical supported catalyst. Aerosol processes may advantageously employ elevated pressures of up to 100 atm. Supported catalyst processes operate at ambient pressures and may even be operated at vacuum. Preferred gas phase carbon sources are CO, $CH_4$, ethanol and benzene. Preferred temperatures are between 500 and 1000° C.

Additional methods of producing single wall nanotubes production have been described in PCT Application No. PCT/US99/25702 and PCT Application No. PCT US98/16071 herein incorporated by reference. Single wall nanotubes are useful in a variety of applications. The tubular structure imparts superior strength, low weight, stability, flexibility, thermal conductivity, large surface area and a host of electronic properties. They can be used as reinforcements in fiber reinforced composite structures or hybrid composite structures, i.e., composites containing reinforcements such as continuous fibers in addition to single wall nanotubes. The carbon nanotubes may be treated in their as-made form or may be deposited as a film on a suitable substrate and then treated. All of these references are herein incorporated by reference.

Nanotube Deposition Methodology—Disclosed in Electrophoretic Deposition of Nanotubes (from U.S. Patent App'n Pub. 2003/0090190, herein Incorporated by Reference).

The Electrophoresis Bath

The electrophoretic deposition of the carbon nanotubes may be conducted in an electrophoresis bath. The bath consists of a chamber to contain the solution of carbon nanotubes and means for immersing two opposing electrodes separated by some distance with the carbon nanotubes between the opposing electrodes. A DC power supply, external to the bath, is used to apply a voltage between the two electrodes immersed in the bath. The cathode lead is connected to the patterned aluminum substrate and the anode lead is connected to the other electrode. Tantalum was used for the second metal. The voltage applied to the two electrodes can be adjusted to a suitable level or the voltage can be adjusted to obtain a suitable current between the two electrodes. The attachment of carbon nanotubes to the aluminum can be enhanced by a binder. The binders can be a mixture of Ag paste, carbon nanotubes and ethanol. Or the binders can be a conductive carbon paste, a conductive metal paste or a carbonizable polymer.

Electrophoretic Deposition of Carbon Nanotubes on the Substrate

A field emitter substrate is loaded into the electrophoresis bath. A plurality of cathodes are arranged on a glass substrate, and a dielectric film is formed with holes over the cathodes. Metal gates with openings which are located over the holes of the dielectric film are formed to expose the surface of the cathodes. Then, the carbon nanotubes are uniformly deposited onto the obtained substrate, on the surface of the cathodes exposed through the holes by electrophoretic deposition at room temperature.

Post Deposition Heat Treatment

After the deposition of carbon nanotube particles by electrophoresis, low-temperature heating is performed to sustain the deposition of the carbon nanotubes on the cathodes and ensure easy removal of impurities which are incorporated into the field emitter during the deposition.

Preparation of Nanotube Film on Aluminum Substrate (Example from U.S. Patent App'n Pub. 2003/0090190 herein Incorporated by Reference)

With reference to FIG. 17, a solution is formed that contains 150 ml i-propyl alcohol (IPA) and 0.44 grams of acid washed carbon nanotubes. This solution is placed in an electrophoresis bath 5000.

A patterned, aluminum coated glass substrate 5002 serves as one electrode in electrophoresis bath 5000. The pattern forms the pixel size. The smallest feature size can be ca. 1 micron. The aluminum coated glass 5002 is about 55 mm.×45 mm.×1 mm in its dimensions. The aluminum pattern size is about 9 mm×9 mm. The other electrode, tantalum (Ta) electrode 5004 is also inserted into the electrophoresis bath 5000. A spacer 5006 separates the aluminum coated glass 5002 from the tantalum electrode 5004. A DC voltage, for example between 40 to 120 volts, e.g., 100 volts is applied to the electrodes. A current between 1.0 to 5 mA, e.g., 3.8 mA, is observed between the electrodes. The duration of the preparation time can be between about 30 to about 90 minutes, e.g., 60 minutes.

FIG. 18 illustrates an alternative electrophoretic method of creating the film according to the method disclosed in UK patent application 2,353,138 described below. First, a carbon nanotube suspension is created. The carbon nanotube particles can have lengths from about 0.1 to about 1000 microns. The suspension can also include a surfactant, e.g. an anionic, ionic, amphoteric or nonionic, or other surfactant known in the art. Examples of suitable surfactants include octoxynol, bis(1-ethylhexyl)sodium sulfosuccinate, and nitrates of $Mg(OH)_2$, $Al(OH)_3$ and $La(OH)_3$.

The suspension is then subjected to an electric field to charge the carbon nanotube particles. The intensity of the electric field and the time for which the electric field is applied define the thickness of the carbon nanotube layer. Greater intensity and longer time yield thicker layers.

With reference to FIG. 18, the field emitter substrate 6030 is loaded into the electrophoresis bath 6000 containing a carbon nanotube suspension 6010. An electrode plate 6020 is also installed in the electrophoresis bath 6000 spaced apart from the field emitter substrate 6030. The cathode of a DC power supply 6040, which is installed outside of the electrophoresis bath 6000, is connected to the other cathodes of the field emitter substrate 6030 and the anode of the DC power supply 6040 is connected to the electrode plate 6020. Then, a bias voltage of about 1 to-about 1000 volts is applied from the DC power supply 6040 between the electrode plate 6020 and the cathodes of the field emitter substrate 6030.

As a positive voltage of the DC power supply 6040 is applied to the electrode plate 6020, carbon nanotube particles charged by positive ions in the carbon nanotube suspension 6010 migrate to and are attached to the exposed cathodes of the field emitter substrate 6030, which results in the formation of a carbon nanotube film in the pattern of the exposed cathodes.

The height of the printed carbon nanotube film, also known as the ink, coating, or paste, may be less than 10 microns and the space which isolates carbon nanotube cathodes from the indium tin oxide anode with indium tin oxide and phosphor is about 125 microns.

The electrophoresis process can be applied to both diodes and triodes. For applications to a diode, an electric field having opposite charges to those on the surfaces of the carbon nanotube particles is applied to exposed electrode surface of a field emitter substrate for selective deposition of carbon nanotube particles thereon. For application to a triode having gates, a weak positive electric field is applied to the gates while a positive electric field is applied to the electrodes of the field emitter substrate, which avoids deposition of carbon nanotube particles on the gates. In particular, the electrode plate is connected to the anode of the DC power supply and the cathodes of the field emitter substrate are connected to the cathode of the DC power supply. As a positive potential is applied to the gates, the gates repel positive ions in the carbon nanotube suspension at the surface, while the exposed cathodes of the field emitter substrate, which are connected to the cathode of the DC power supply, pull positive ions of the suspension through the holes. As a result, the carbon nanotubes are deposited only on the entire exposed surface of the cathodes, not on the gates of the field emitter substrate. At this time, carbon nanotube particles are attracted to the field emitter substrate and are oriented substantially horizontal, or substantially parallel to the substrate, which allows the carbon-nanotube particles to smoothly migrate through the holes to the cathodes, and thus the carbon nanotubes can be deposited.

The film can also be prepared similarly to the carbon ink disclosed in European Patent Application EP 1 020 888 A1—Carbon ink, electron-emitting element, method for manufacturing and electron-emitting element and image display device.

SUMMARY OF THE INVENTION

In accordance with an embodiment, a field emission device is provided. The device has a cathode and an anode. The cathode comprises a carbon nanotube mat wherein the carbon nanotube mat is produced from a filter cake formed by filtering a plurality of nanotubes from a liquid suspension. The mat may have a top surface and an opposing bottom surface. The bottom surface corresponds to a filter cake surface disposed adjacent to a filter during forming of the mat. The top surface may act as an emitting surface of the cathode.

The plurality of nanotubes may have a diameter less than about one micron.

The plurality of nanotubes may have a morphology resembling a fishbone. The plurality of nanotubes may be single wall or multiwall. The nanotubes may be oxidized; they may be crosslinked. The filter cake may have been formed in the presence of a binder. That binder may, in an embodiment, be a solvent soluble fluoropolymer. It may be PVDF.

Field emission cathodes are provided which comprise a carbon nanotube mat produced from a filter cake formed by filtering a plurality of nanotubes from a liquid suspension.

A method of treating a field emission cathode comprising nanotubes to improve turn-on voltage is also provided. The method includes irradiating the cathode with appropriate wavelength radiation for sufficient time and intensity. The radiation may be in the ultraviolet range. In irradiating, the cathode may be exposed to a continuous or pulsed laser. The radiation may have a wavelength of less than approximately 349 nm. The radiation may have an energy density greater than about 10.3 mJ/cm$^2$. Irradiating may be performed in air or may be performed in a partial pressure of oxygen of at least one torr. The cathode may be comprised of a carbon nanotube mat. Field emission cathodes irradiated in this manner are also provided.

Methods of treating a field emission cathode comprising nanotubes to improve cathode emission current density are provided as further embodiments. Methods of treating a field emission cathode comprising nanotubes to increase the number of emission sites and the uniformity of emission across the cathode are also provided. These methods include UV irradiation and exposure to low temperature plasma.

A method of orienting nanotubes within a structure comprising irradiating the structure for a sufficient time and intensity is provided. A method of orienting nanotubes within a structure comprising exposing the structure to a low temperature plasma under appropriate conditions is provided.

In another embodiment, the field emission device has a plurality of nanotubes substantially cylindrical having one or more graphitic layers concentric with their cylindrical axes, the nanotubes being substantially free of pyrolytically deposited carbon overcoat, having a substantially uniform diameter between 0.4 nm and 100 nm and having a length to diameter ratio greater than 5 is provided.

DETAILED DESCRIPTION OF SPECIFIC EMBODIMENTS

Figure 1:
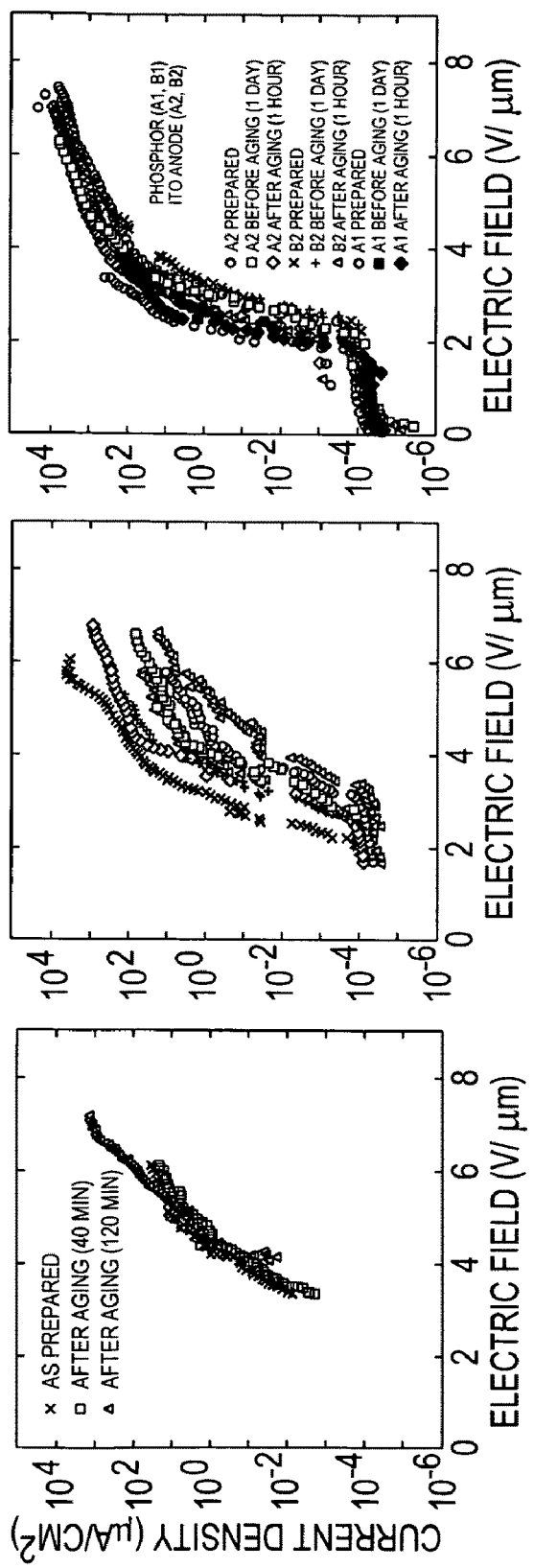
FIG. 1 illustrates the electron emission behavior of electrophoretically deposited carbon nanotubes, screen printed carbon nanotubes and carbon nanotube mats in the form of plots of current density as a function of the electric field.

All referenced patents, patent applications, and publications in the specification, including the appended bibliography are herein incorporated by reference herein.

Definitions

"Aggregate" refers to a microscopic particulate structures of nanotubes.

"Assemblage" refers to nanotube structures having relatively or substantially uniform physical properties along at least one dimensional axis and desirably having relatively or substantially uniform physical properties in one or more planes within the assemblage, i.e. having isotropic physical properties in that plane. The assemblage can comprise uniformly dispersed individual interconnected nanotubes or a mass of connected aggregates of nanotubes. In other embodiments, the entire assemblage is relatively or substantially isotropic with respect to one or more of its physical properties.

"Carbon fibril-based ink" refers to an electroconductive liquid composite in which the electroconductive filler is carbon fibrils.

"Graphenic" carbon is a form of carbon whose carbon atoms are each linked to three other carbon atoms in an essentially planar layer forming hexagonal fused rings. The layers are platelets having only a few rings in their diameter or ribbons having many rings in their length but only a few rings in their width.

"Graphenic analogue" refers to a structure which is incorporated in a graphenic surface.

"Graphitic" carbon consists of layers which are essentially parallel to one another and no more than 3.6 angstroms apart.

"Low temperature plasma" refers to a gaseous system sufficiently ionized to be electrically conducting but still electrically neutral, wherein the electrons are at a higher temperature than the molecules. See Baddour, R. F. and Timmins, R. S. eds, *The Application of Plasmas to Chemical Processing*, MIT Press, Cambridge Mass. 1967

"Nanotube", "nanofiber" and "fibril" and "CNT" are used interchangeably. Each refers to an elongated hollow carbon structure having a diameter less than 1 micron. The term "nanotube" also includes "bucky tubes" and graphitic nanofibers in which the graphene planes are oriented in herringbone or fishbone pattern.

The terms "emitter tips" and "emitters" are interchangeable. The use of the word "tip" is not meant to limit the emission of the electrons only to the tips of the carbon nanotubes. The electrons can be emitted from any part of the carbon nanotubes.

Manufacturing Methods

In addition to electrophoresis (described in background art section above), other processes such as screen printing can be used for creating the patterns used to make field emission devices. A screen printing process was previously disclosed in U.S. Pat. No. 6,239,547. In addition to screen printing, the carbon nanotubes can be applied to a substrate by ink jet printing. Ink printing is accomplished with carbon nanotube based liquid media or inks in which the fibrils are nearly individualized. Inks typically contain a carrier liquid, carbon nanotubes, and usually also a polymeric binder. Useful binders include VAGH, VAGF, cellulose acetate butyrate, ethyl cellulose, crosslinkable polymers and acrylate polymers. These may be present in the range of 1 to 7 wt % of the ink. The liquid vehicle may be a polar organic solvent, preferably boiling between 150° C. and 200° C.

Inks may be dried (i.e., evaporate the carrier liquid) to create a patterned coating. Inks are more fully described in PCT/US03/19068 incorporated herein by reference. Depending on the printing process contemplated, inks may have a viscosity between 1 and 50,000 cps. Useful carbon nanotube loadings are from 0.5 to 2.5 wt %.

CNT Mats

The carbon nanotubes can also be deposited in the form of a mat. Such porous mats, having densities between 0.10 and 0.40 gm/cc and surface areas greater than 100 sq. m/gm, are conveniently formed by filtration of suspensions of nanotubes. Methodology is more fully disclosed in U.S. Pat. Nos. 6,099,965 and 6,031,711, both of which are herein incorporated by reference. If the nanotubes are supplied in the form of aggregates, it is not necessary to fully individualize the nanotubes before making a mat. As a simple example, a suspension of nanotubes was prepared containing about 0.5% nanotubes in water using a Waring blender. After subsequent dilution to 0.1%, the nanotubes were further dispersed with a probe type sonifier. The dispersion was then vacuum filtered to form a mat, and then oven dried. This results in a filter cake, having a top and bottom surface. Filter material which initially adheres to the bottom surface is peeled away when a mat is successfully made. Oxidized nanotubes are particularly easily dispersed in and then filtered from aqueous media.

Figure 2:
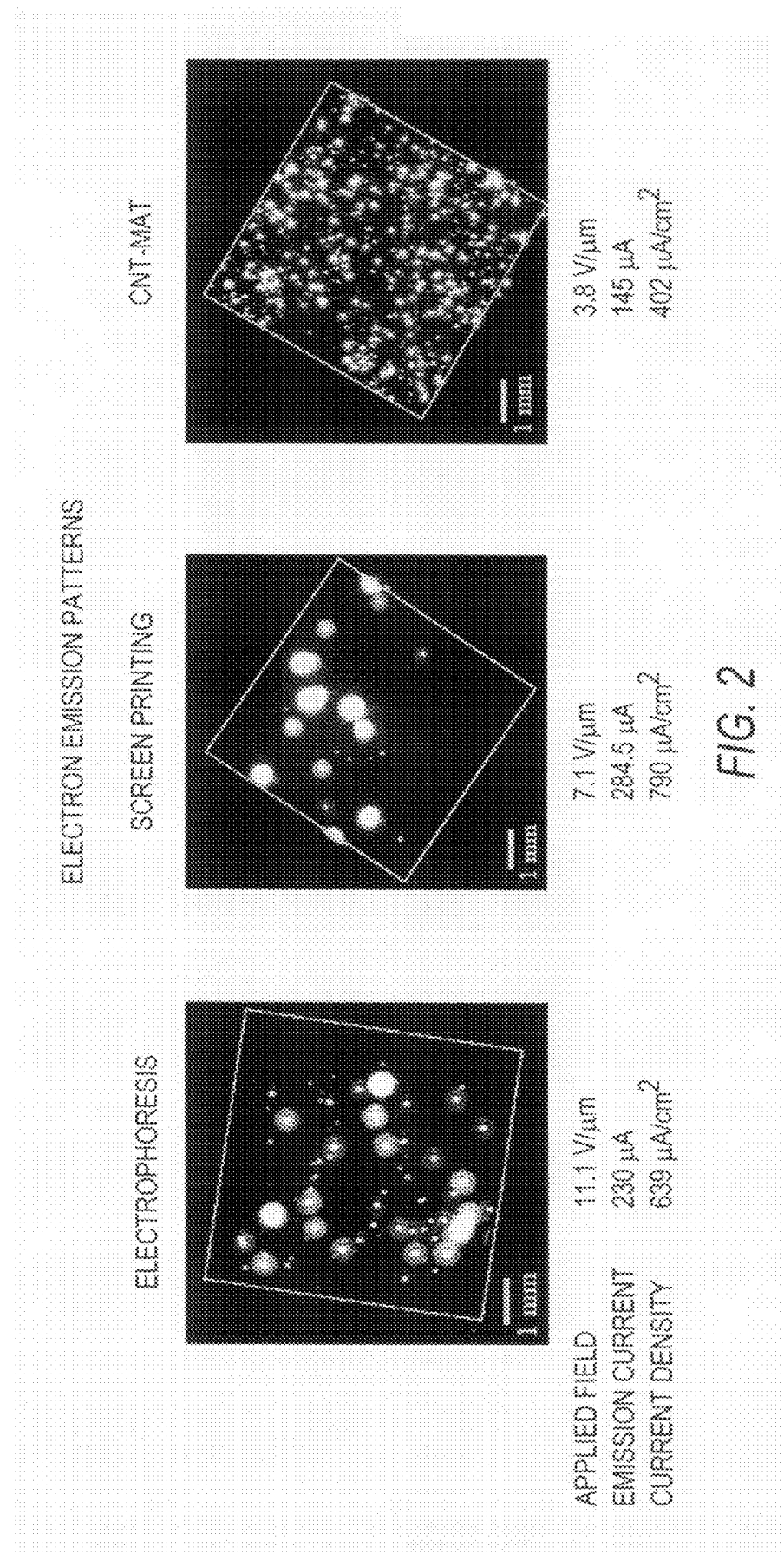
FIG. 2 is a series of photographs of electron emission patterns of electrophoretically deposited carbon nanotubes, screen printed carbon nanotubes and carbon nanotube mats.

The mats may be subjected to a rigidization or cross linking step as discussed in the aforecited patents. Oxidized fibril mats can be rigidized by heat treatment in air at up to 300° C. Alternatively, the mats may be rigidized by heat treatment in an oxygen free atmosphere at up to 600° C. CNT mat cathodes have uniform emission sites at relatively low applied field and may obtain a current density of more than 10 mA/cm$^2$. A comparison of the electron emission behavior of electrophoretically deposited carbon nanotubes, screen printed carbon nanotubes and carbon nanotube mats in the form of plots of current density as a function of the electric field is displayed in FIG. 1. A further comparison of the electron emission patterns of electrophoretically deposited carbon nanotubes, screen printed carbon nanotubes and carbon nanotube mats is displayed in FIG. 2.

CNT mats cathodes may also be produced utilizing various types of binders. Useful binders include cellulose, carbohydrates, polyethylene, polystyrene, nylon, polyurethane, polyester, polyamides, phenolic resins and any other binder than on pyrolysis yields carbon. Pyrolysis temperature depends on the binder used, but can be up to 300° C. in air or up to 900° C. in an oxygen free environment. It is not necessary, however, to pyrolyze the binder. Polymeric binders that can be dissolved in a solvent containing a fibril suspension and then precipitated by addition of a non-solvent for that polymer can be used to form mats by subsequent filtration. PVDF is an example of such a polymer.

Plasma Treatment

In a preferred embodiment, the carbon nanotube or the carbon nanotube mats are subjected to plasma treatment. In yet another preferred embodiment, the screen printed inks containing carbon nanotubes are subjected to plasma treatment. Alternatively, the field emission cathode or field emission device itself is subjected to plasma treatment. Plasma treatment results in improved field emission performance for the carbon nanotube mat or ink, and consequently leads to a better field emission cathode or field emission device.

Plasma treatment is carried out in order to alter the surface characteristics of the carbon fibrils, fibril structures and/or the matrix, which come in contact with the plasma during treatment; by this means the fibril composite treated can be functionalized or otherwise altered as desired. Once equipped with the teaching herein, one of ordinary skill in the art will be able to adapt and utilize well-known plasma treatment technology to the treatment of such composite materials. Thus, the treatment can be carried out in a suitable reaction vessel at suitable pressures and other conditions and for suitable duration, to generate the plasma, contact it with the composite material, and effect the desired kind and degree of modification. Plasmas such as those based on oxygen, hydrogen, ammonia, helium, or other chemically active or inert gases can be utilized.

Examples of other gases used to generate plasmas include, argon, water, nitrogen, ethylene, carbon tetrafluoride, sulfurhexafluoride, perfluoroethylene, fluoroform, difluoro-dicholoromethane, bromo-trifluoromethane, chlorotrifluoromethane, and the like. Plasmas may be generated from a single gas or a mixture of two or more gases. It may be advantageous to expose a composite material to more than one type of plasma. It may also be advantageous to expose a composite material to a plasma multiple times in succession; the conditions used to generate the plasma, the duration of such successive treatments and the duration of time between such successive treatments can also be varied to accomplish certain alterations in the material. It is also possible to treat the composite material, e.g., coat the material with a substance, wash the surface of the material, etc., between successive treatments.

Plasma treatment of a composite material may effect several changes. For example, a composite material comprising a polymer and a plurality of carbon fibrils dispersed therein can be exposed to plasma. Exposure to plasma may etch the polymer and expose carbon fibrils at the surface of the composite, thus increasing the surface area of exposed carbon fibrils, e.g., so that the surface area of the exposed fibrils is greater than the geometric surface area of the composite. Etching of the polymer may also free nanotube ends or segments that had been constrained by the polymer allowing them to move or reorient. Exposure to plasma may introduce chemical functional groups on the fibrils or the polymer. Treatment can be carried out on individual fibrils as well as on fibril structures such as aggregates, mats, hard porous fibril structures, and even previously functionalized fibrils or fibril structures. Surface modification of fibrils can be accomplished by a wide variety of plasmas, including those based on $F_2$, $O_2$, $NH_3$, He, $N_2$ and $H_2$, other chemically active or inert gases, other combinations of one or more reactive and one or more inert gases or gases capable of plasma-induced polymerization such as methane, ethane or acetylene. Moreover, plasma treatment accomplishes this surface modification in a "dry" process as compared to conventional "wet" chemical techniques involving solutions, washing, evaporation, etc. For instance, it may be possible to conduct plasma treatment on fibrils dispersed in a gaseous environment.

Once equipped with the teachings herein, one of ordinary skill in the art will be able to practice the invention utilizing well-known plasma technology. The type of plasma used and length of time plasma is contacted with fibrils will vary depending upon the result sought. For instance, if oxidation of the fibrils' surface is sought, an $O_2$ plasma would be used, whereas an ammonia plasma would be employed to introduce nitrogen-containing functional groups into fibril surfaces. Once in possession of the teachings herein, one skilled in the art would be able to select treatment times to effect the degree of alteration/functionalization desired.

More specifically, fibrils or fibril structures are plasma treated by placing the fibrils into a reaction vessel capable of containing plasmas. A plasma can, for instance, be generated by (1) lowering the pressure of the selected gas or gaseous mixture within the vessel to, for instance, 100-500 mTorr, and (2) exposing the low-pressure gas to a radio frequency which causes the plasma to form. Upon generation, the plasma is allowed to remain in contact with the fibrils or fibril structures for a predetermined period of time, typically in the range of approximately 10 minutes more or less depending on, for instance, sample size, reactor geometry, reactor power and/or plasma type, resulting in functionalized or otherwise surface-modified fibrils or fibril structures. Surface modifications can include preparation for subsequent functionalization.

Treatment of a carbon fibril or carbon fibril structure as indicated above results in a product having a modified surface and thus altered surface characteristics which are highly advantageous.

Laser Treatment

In a preferred embodiment, the carbon nanotube or the carbon nanotube mats are subjected to laser treatment. In yet another preferred embodiment, the screen printed inks containing carbon nanotubes are subjected to laser treatment. Laser treatment results in improved field emission performance for the carbon nanotube mat or ink, and consequently leads to a better field emission cathode or field emission device.

With laser treatment, the carbon nanotubes, carbon nanotube mats or carbon nanotube inks are irradiate with laser (i.e., UV, IR etc) for a period of time. Alternatively, the field emission cathode or field emission device may also be irradiated with laser.

EXAMPLES

The following examples illustrate the various embodiments of the invention.

Example 1

Mat with PVDF Binder

Good field emission characteristics were obtained with a CNT mat with a PVDF binder. To prepare the mat, 0.04 grams of PVDF (Kynar 741) was dissolved in 150 milliliters of acetone. CC type carbon nanotubes, 0.16 grams, were blended into the PVDF/acetone solution in a Waring blender. When the suspension appeared uniform, DI water was added, causing the PVDF to precipitate. The CC type carbon nanotubes were entrapped within the precipitated PVDF. The precipitate was washed with water, and filtered onto a Nylon membrane to form a thin mat. The mat was marked so that the top (air surface) and bottom (Nylon membrane surface) could be identified. The mat was dried in a low temperature oven (80° C.) and labeled 296-29-3.

Sections of the CNT mat 296-29-3 were cut and pasted onto the surface of an aluminum film/glass substrate using silver paste. The I-V characteristics of the CNT mat (both top and bottom surfaces) were measured. Further, UV laser irradiation was carried out in air to improve emission characteristics (see discussion of UV laser irradiation treatment below). The UV laser emitted a wavelength of 266 nm, had a pulse-width of 5 ns, an irradiation energy density of 20.3 mJ/cm$^2$, and a repetition frequency of 10 Hz. The laser spot was moved with an overlap rate of 25% within the cathode area after each of irradiation time. The irradiation was performed for 60 seconds for each spot of the irradiated array on the surface of CNT mat.

Example 2

Mat with Surfactant Binder

A stable dispersion of hydrophobic carbon nanotubes can be created with the use of surface active agents like surfactants and dispersing aids. Mats can then be made using the dispersions. 0.55 grams of Surfynol CT324 (Air Products) was dissolved in 200 mls of DI water. 0.15 grams of CC-type carbon nanotubes were added and dispersed using a probe sonicator (Branson). The dispersed material was filtered onto a Nylon membrane (0.45 micron pore size) and air dried. When dry the mat could be separated from the Nylon membrane. The mat was marked so that the top (air side) and bottom (Nylon membrane side) could be identified. This mat was labeled 296-29-1.

Alternatively, the mat could be washed to remove any loosely bound Surfynol. 0.60 grams of Surfynol CT324 (Air Products) was dissolved in 200 mls of DI water. 0.15 grams of CC-type carbon nanotubes were added and dispersed using a probe sonicator (Branson). The dispersed material was filtered onto a Nylon membrane (0.45 micron pore size) and washed with methanol by using the vacuum apparatus to pull the methanol through the mat. The washed mat was then air dried. When dry the mat could be separated from the Nylon membrane. The mat was marked so that the top (air side) and bottom (Nylon membrane side) could be identified. This mat was labeled 296-29-2.

Figure 6:
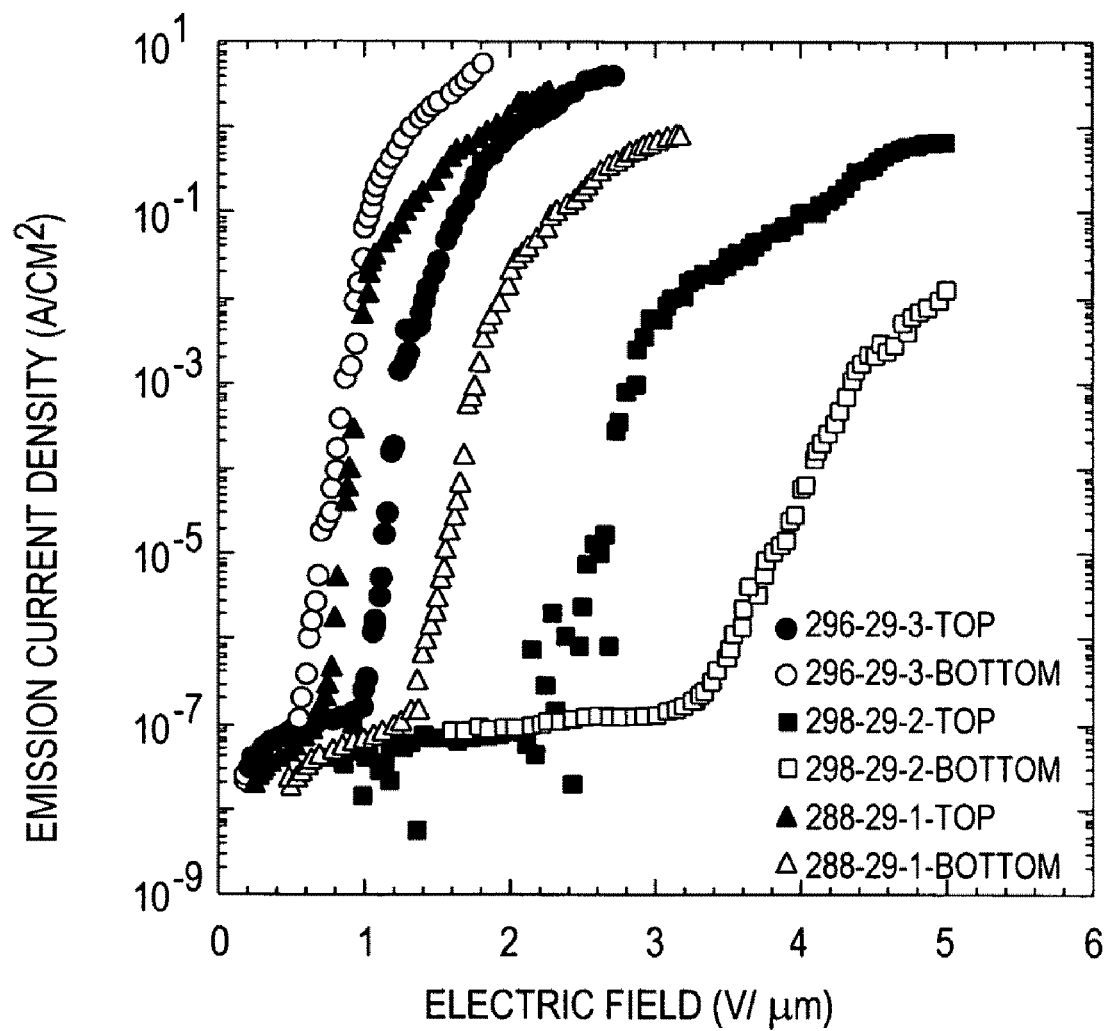
FIG. 6 is a comparative plot of emission current density vs. electric field (I-V characteristics) for top and bottom surfaces of CNT mat cathodes made with various binders in accordance with an embodiment.
Figure 7:
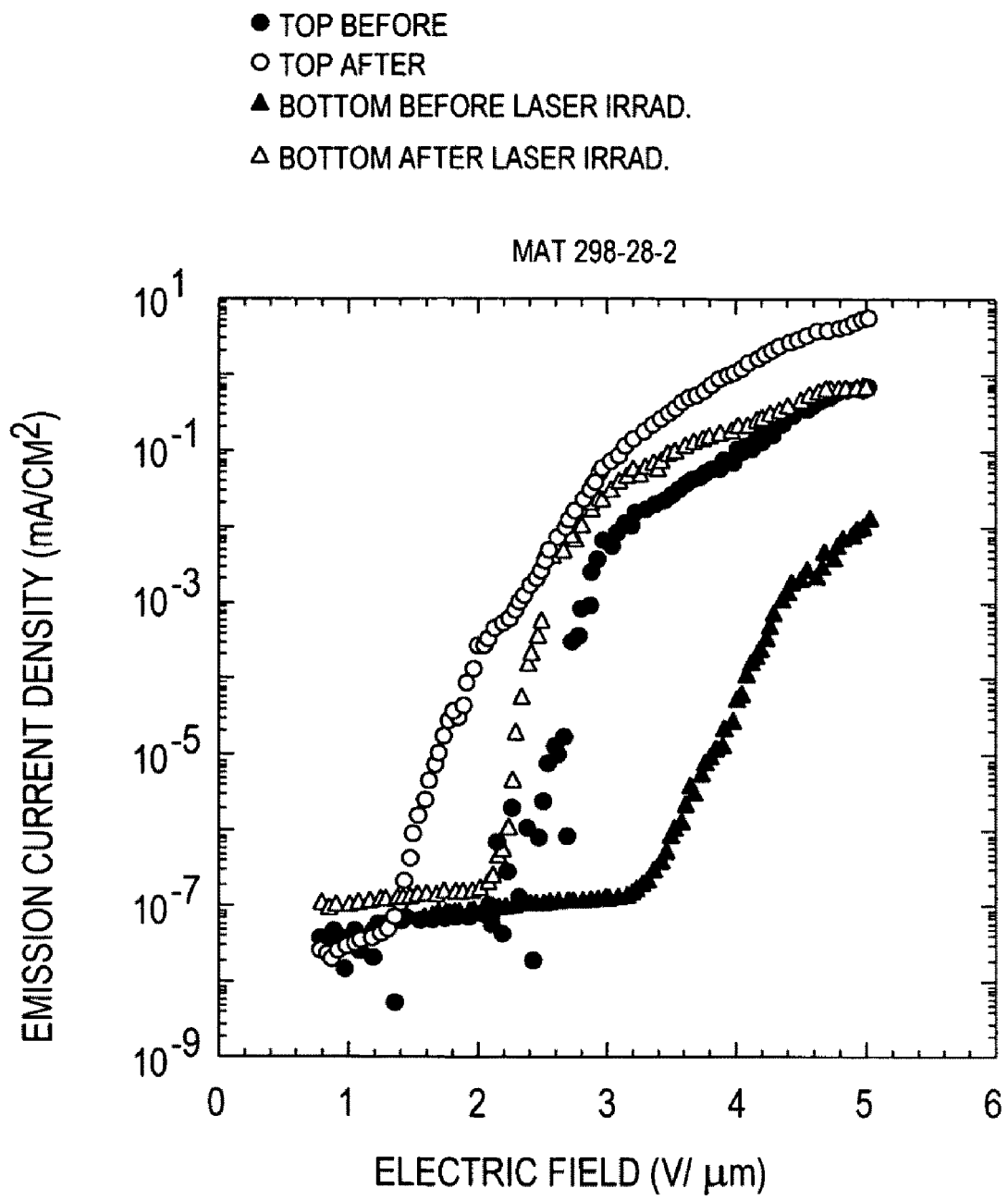
FIG. 7 is a comparative plot of emission current density vs. electric field (I-V characteristics) for top and bottom surfaces of a CNT mat cathode made with a binder before and after irradiation in accordance with another embodiment.
Figure 8:
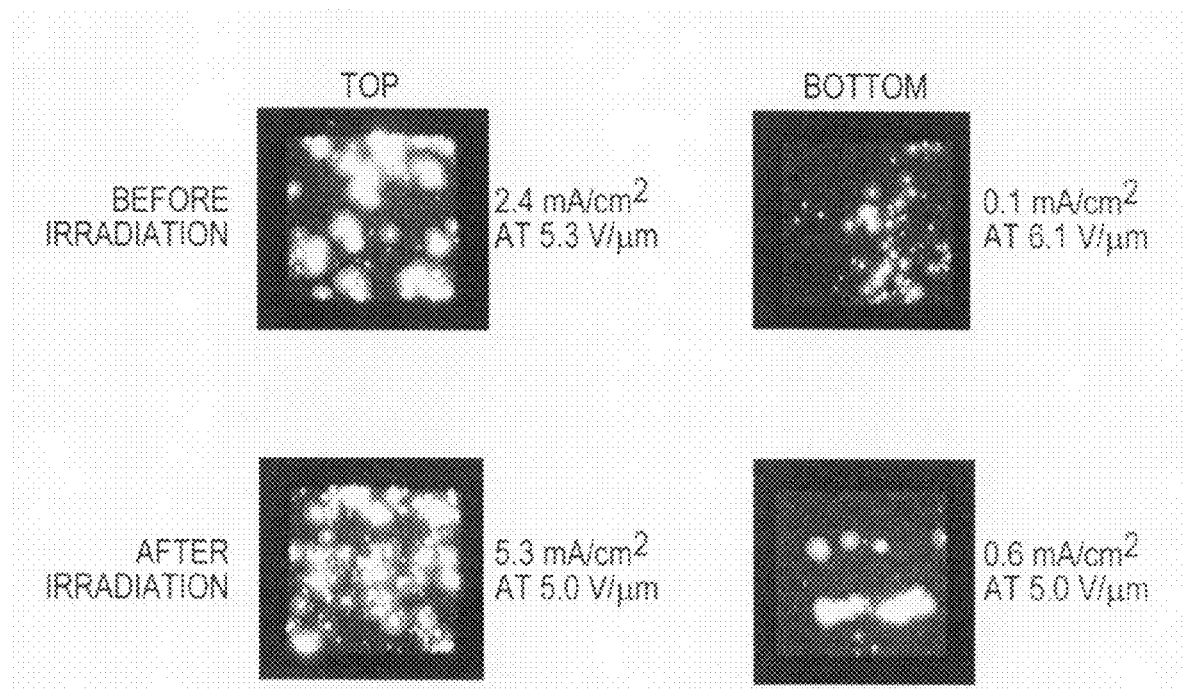
FIG. 8 illustrates a comparison of emission patterns showing an increase in both the number of emission sites and in emission current density achieved in CNT mat cathodes after UV laser irradiation in accordance with a further embodiment.

Field emission measurements for samples described in Examples 1 and 2 without laser irradiation are shown in FIG. 6. A comparison of field emission results for sample 296-29-2 before and after as well as top and bottom surface comparison is shown in FIG. 7. FIG. 8 is a series of comparative photographs of electron emission patterns from sample 296-29-2 before and after irradiation. FIG. 6 reveals dramatic reduction in turn-on voltage for the top surfaces of samples 296-29-1 and 296-29-3 when compared with the top surface of 296-29-2. The results in FIG. 6 also show the major improvement in I-V character when top mat surfaces are used as the cathode as opposed to bottom surfaces. FIG. 7 illustrates that after 296-29-2, was irradiated, its emission characteristics dramatically improved, almost to the levels of the other two samples. These plots are done on logarithmic scale. The photomicrographs (FIG. 8) comparing the top surface of 296-29-2 before an after laser irradiation illustrate how samples appear with an order of magnitude difference in overall current density at the same working electric voltage.

Modification of Carbon Nanotube Films

The carbon nanotubes, or film, may be modified by chemical or mechanical treatment. The surface may be treated to introduce functional groups. Techniques that may be used include exposing the carbon nanotubes to electromagnetic radiation, ionizing radiation, plasmas or chemical reagents such as oxidizing agents, electrophiles, nucleophiles, reducing agents, strong acids, and strong bases and/or combinations thereof. Of particular interest are UV laser irradiation treatment and plasma treatment.

UV Laser Irradiation Treatment of Nanotube Films

Irradiation treatment is carried out in order to alter the surface characteristics of the carbon fibrils, fibril structures and/or the matrix within which the nanotubes are contained. Numerous experiments have been performed utilizing UV radiation to enhance cathode performance. Initial studies were performed on screen printed CNT cathodes; more recent results have been obtained on CNT mats.

Screen Print

CNT, catalytic grown from hydrocarbon in a gas phase, were screen-printed on an ITO (indium tin oxide)/glass substrate using a conventional organic binder and baked at 350-450° C. for 30 min in air. The CNT cathode area was 8×8 mm$^2$. A diode structure with a spacer of 150 μm was used to measure the emission current. The electron emission pattern was observed through a phosphor screen on the ITO/glass substrate, which acts as the anode (anode area: 5×5 mm$^2$) in the diode structure. The spacer between the anode and the cathode is so thin that the electron emission area would be the same size as the anode size. Electric fields shown in the data were defined as an applied anode bias divided by the spacer thickness minus phosphor/CNT thickness, and the emission current densities were calculated as emission current divided by the anode area. UV irradiation with wavelengths of 349 and 266 nm from a Q-switched tunable Nd:YAG (neodymium: yttrium-aluminum-garnet) laser were used to irradiate CNT cathodes. The repetition frequency of the tunable UV laser was 10 Hz with a pulse duration of 5 ns. Laser energy densities of 20.3, 10.2 and 2.25 mJ/cm$^2$ were adjusted by changing the laser spot area by 4.9, 9.8 and 44.4 mm$^2$ at an average laser energy of 1 mJ. Irradiation time was varied from 10 s to 60 s. The laser spot was moved with an overlap rate of 25% within the cathode area after each of irradiation time. Irradiations both in air and in vacuum were made at an energy density of 20.3 mJ/cm$^2$ for 60 s to study the influence of atmosphere on laser irradiation. CNT cathodes were also irradiated with 30 keV Ga ion beams or exposed to Ar plasma at various conditions for comparison of energetic treatments.

Figure 9:
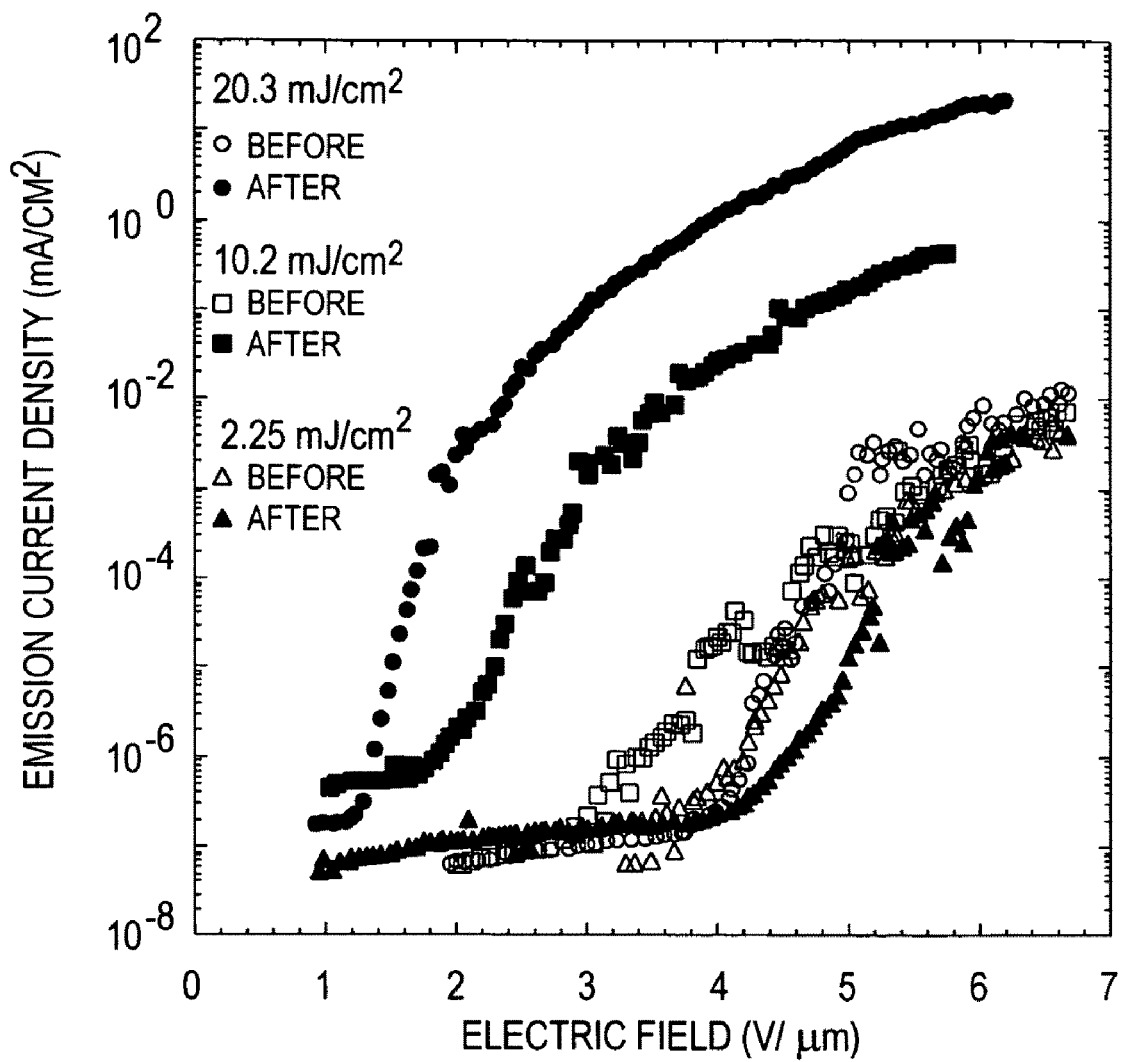
FIG. 9 is a comparative plot of emission current density vs. electric field (I-V characteristics) for screen printed CNT cathodes before and after being exposed to different levels of irradiation in accordance with another embodiment.
Figure 10:
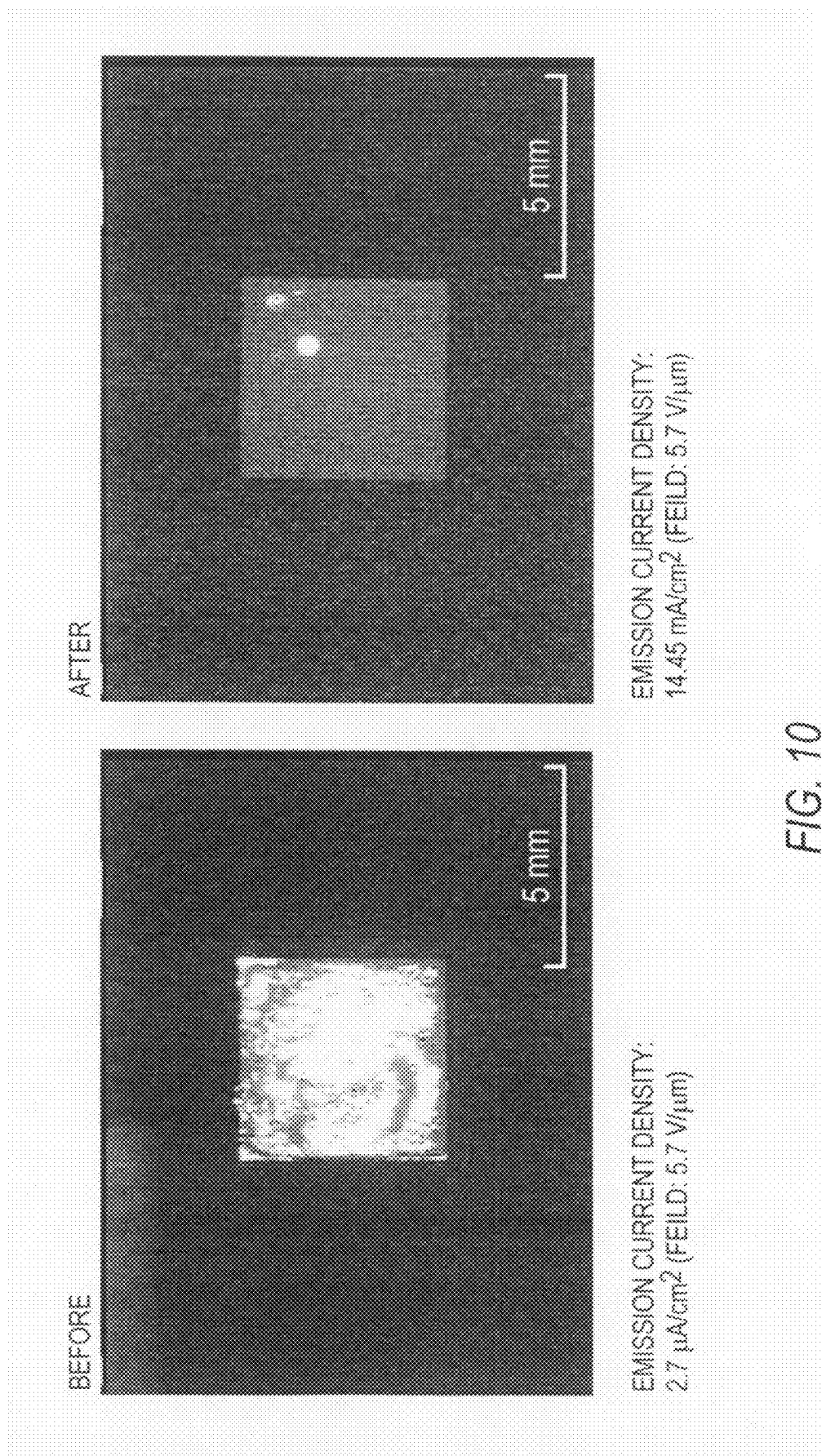
FIG. 10 illustrates a comparison of emission patterns showing an increase in both the number of emission sites and in emission current density achieved in CNT screen printed cathodes after UV laser irradiation in accordance with yet another embodiment.

FIG. 9 shows the I-V characteristics for the CNT emitters before and after 266 nm laser irradiation in air. The emission current density at an applied electric field of 5.7 V/µm increased after laser irradiation from 0.0027 to 14.45 mA/cm$^2$ at a laser energy density of 20.3 mJ/cm$^2$ (FIG. 10 illustrates a dramatic comparison of before and after emission patterns showing an increase in both the number of emission sites and in emission current density) and from 0.0014 to 0.400 mA/cm$^2$ at 10.2 mJ/cm$^2$. The turn-on electric field decreased from 3.7 to 1.2 V/µm at 20.3 mJ/mm$^2$ and 2.8 to 1.5 V/µm at 10.2 mJ/cm$^2$. On the other hand, no improvement was found in the sample irradiated at 2.25 mJ/cm$^2$. A maximum current density of 20.15 mA/cm$^2$ was observed at 6.2 V/µm operating voltage. It is felt that the current density would become much higher if the phosphor anode could endure a stronger electron bombardment at a higher electric field.

Figure 11:
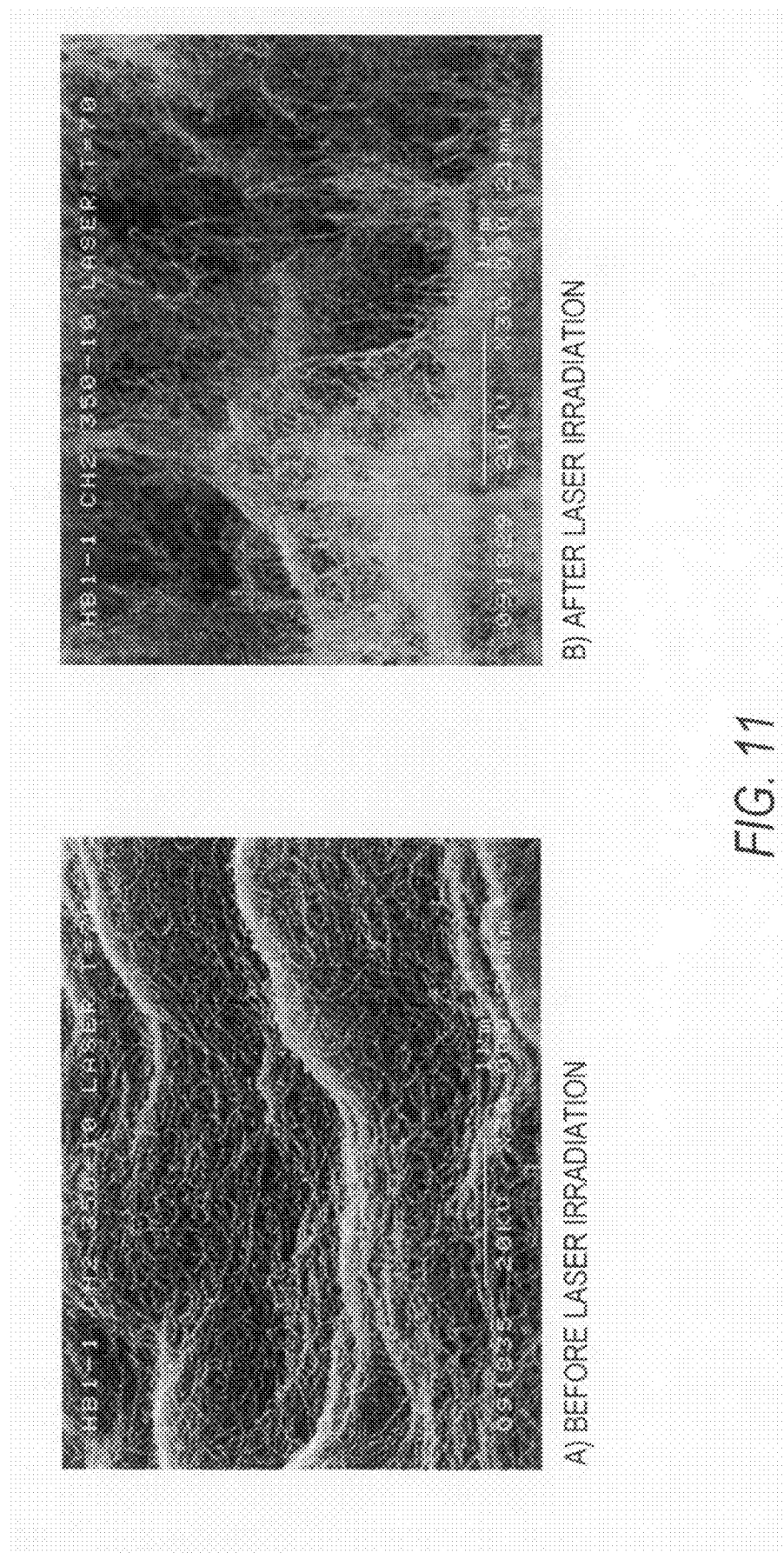
FIG. 11 is a comparison between SEM micrographs of the morphology of carbon nanotubes before and after laser irradiation treatment indicated a change in orientation in accordance with a further embodiment.
Figure 12:
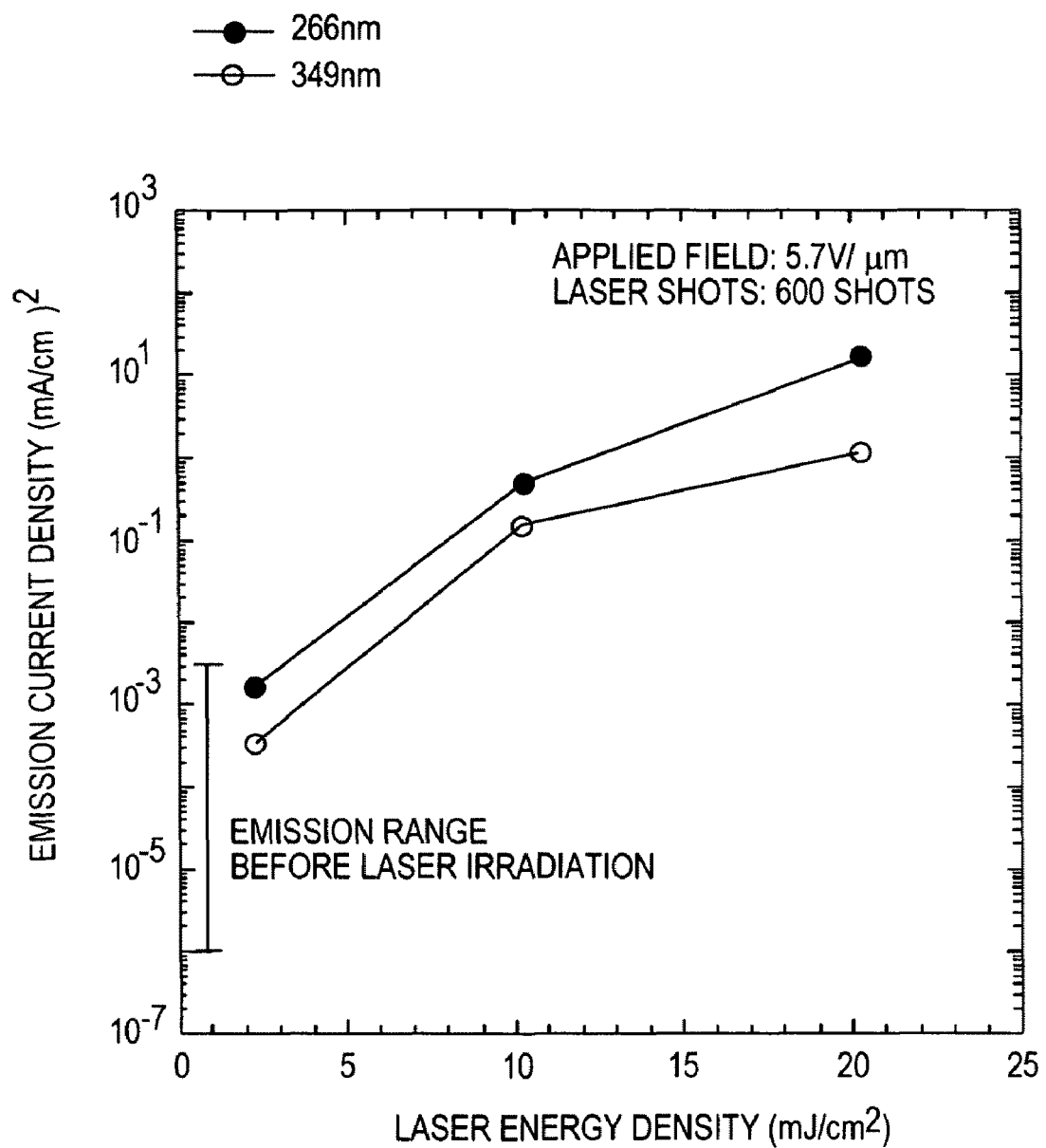
FIG. 12 is a comparison of emission current density obtained after irradiation with different wavelengths in accordance with an embodiment.

FIG. 11 shows the CNT morphology before and after laser irradiation at 266 nm with an energy density of 20.3 mJ/cm$^2$. CNT bundles just after screen-printing and baking are tangled together, while after laser irradiation the CNTs tend to orient themselves with open ends. FIG. 12 shows the emission current density as a function of laser energy density for specifically 266 and 349 nm laser irradiations. The range of the emission current density before laser irradiation was indicated as a bar in the figure. The current density increases by 4 orders of magnitude (about 1 µA/cm$^2$ before to 14.45 mA/cm$^2$ after laser irradiation.) Much better improvement was observed for 266 nm irradiations than for 349 nm irradiations. The difference in improvement by different wavelengths suggests, although not to be bound by a particular theory, that the laser induced reaction is not a simple thermal process, though much higher energy of laser photons is necessary for direct bond breaking of C=C bonds (6.3 eV). It is suggested that the effect induced by UV laser irradiation would be mainly due to the photo-excitation effect such as photo-decomposition rather than thermal effect. For the CNT cathode irradiated by 266 nm laser lights, the emission current density seems to be saturated after 100 shots. On the other hand, as the time increased, the emission current density also increased in the case of 349 nm laser irradiation. This suggests that, in the case of 266 nm laser irradiation, almost all the chemical bonds of C—H, H—O of the organic binder, remained within the CNT cathodes after baking, were broken by the photons and/or were oxidized, and the organic binder was decomposed with less irradiation time. On the other hand, many more laser shots are required for the 349 nm irradiation to decompose the residual organic binder on the surface because of the lower energy of photons. The improvements in the emission characteristics would be photo excitation and decomposition effect rather than thermal effect, since the temperature rise by laser photons at these wavelengths is of almost all the same level.

Figure 13:
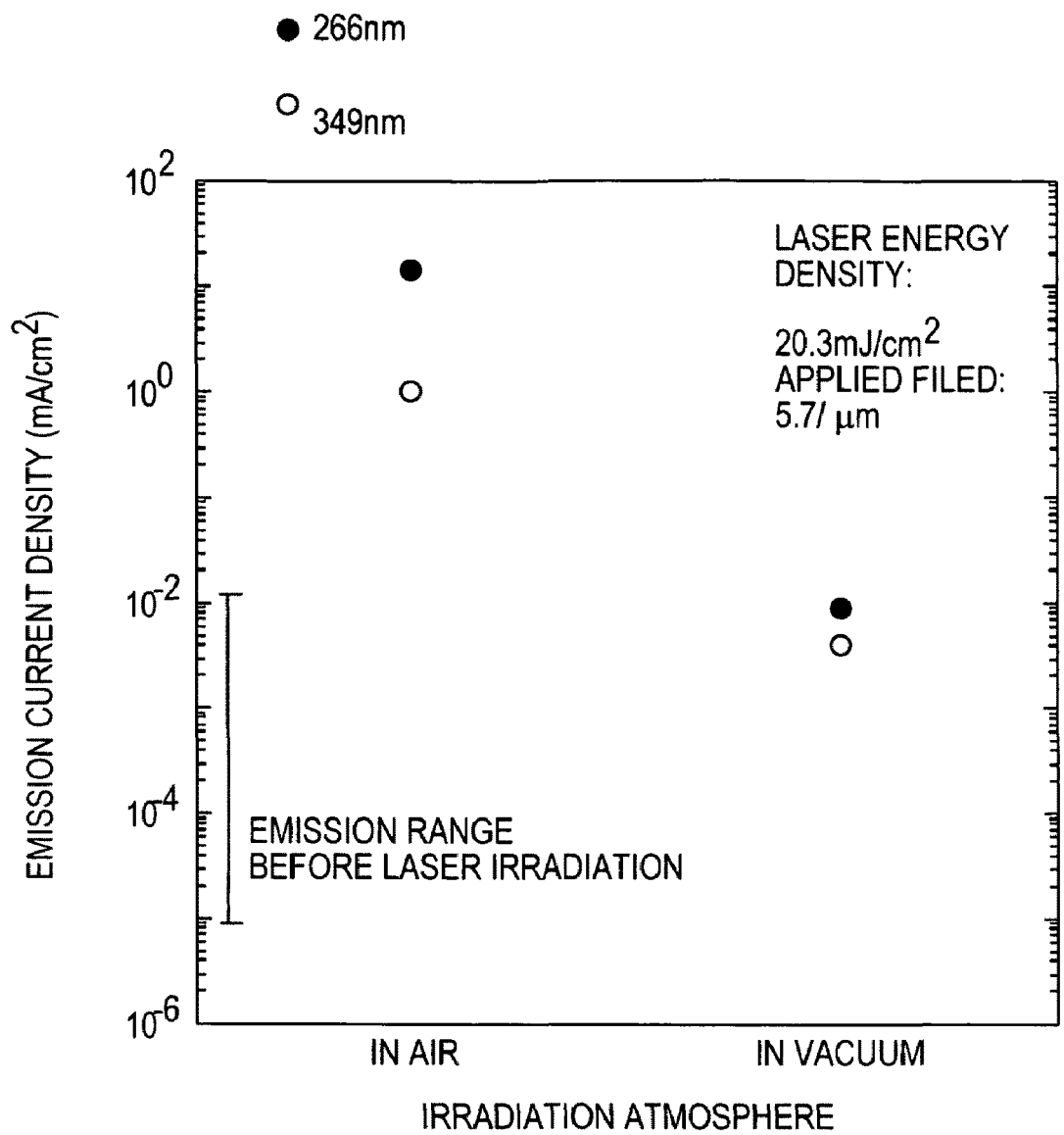
FIG. 13 is a comparison of emission current density obtained after irradiation with different wavelengths in different irradiation atmospheres (air and vacuum) in accordance with an embodiment.

The influence of irradiation atmosphere on emission current density (for air vs. vacuum) at a laser energy density of 20.3 mJ/cm$^2$ for 60 seconds (600 shots) is shown in FIG. 13. The emission current density increases by about 3 orders of magnitude when the samples were irradiated by a 266 nm laser light in air, whereas the improvement of emission current density with irradiations in vacuum was only slightly observed. This indicates the contribution of oxygen during irradiation, i.e., oxidation. Thus the improvement with 266 nm laser irradiation was much pronounced than that by 349 nm laser irradiation in this case too. Further investigation on the oxygen pressure dependence of the laser irradiation is necessary for clarify the effect of laser irradiation.

CNT Mat

A CNT mat was pasted on the surface of an aluminum film/glass substrate using silver paste. Previously, CNT samples were screen-printed on an ITO (Indium Tin Oxide)/glass substrate with organic binder. The I-V characteristics of the CNT mat (for top and bottom surfaces) and screen-printed CNT emitters were tested. Further, UV laser irradiation was carried out in air to improve emission characteristics [3, 4]. The UV laser of 266 nm has a pulse-width of 5 ns, an irradiation energy density of 20.3 mJ/cm$^2$, and a repetition frequency of 10 Hz. The irradiation lasted for 60 seconds for each spot of the irradiated array on the surface of CNT emitters.

Figure 14:
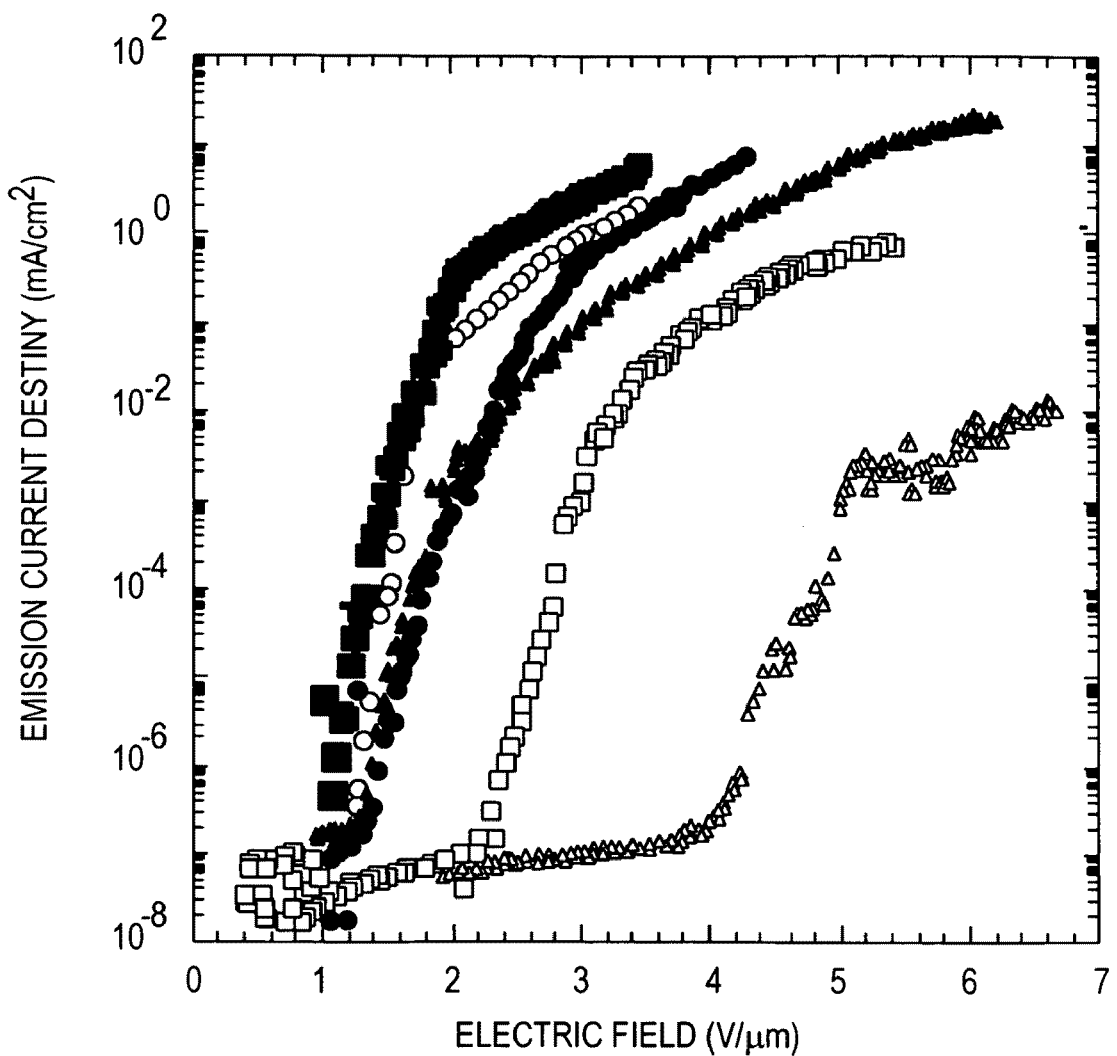
FIG. 14 shows a comparison of emission current density obtained with screen print and top and bottom surfaces of mat CNT cathodes before and after irradiation in accordance with yet another embodiment.
Figure 15A:
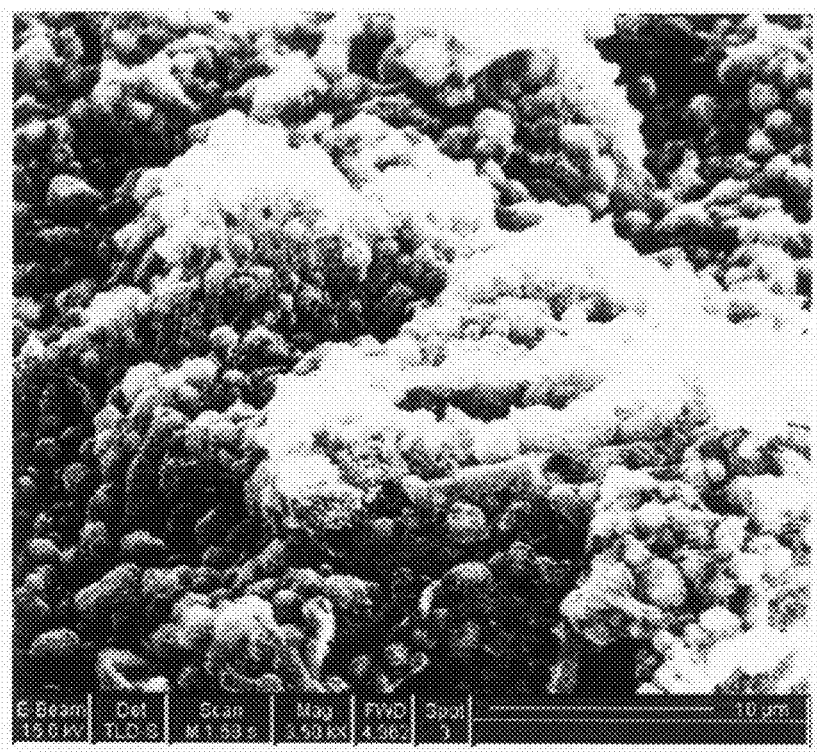
FIG. 15 is a comparison between SEM micrographs of the morphology of carbon nanotubes on the top and the bottom surfaces of a CNT mat after laser irradiation treatment indicated a change in orientation in accordance with a further embodiment.
Figure 15B:
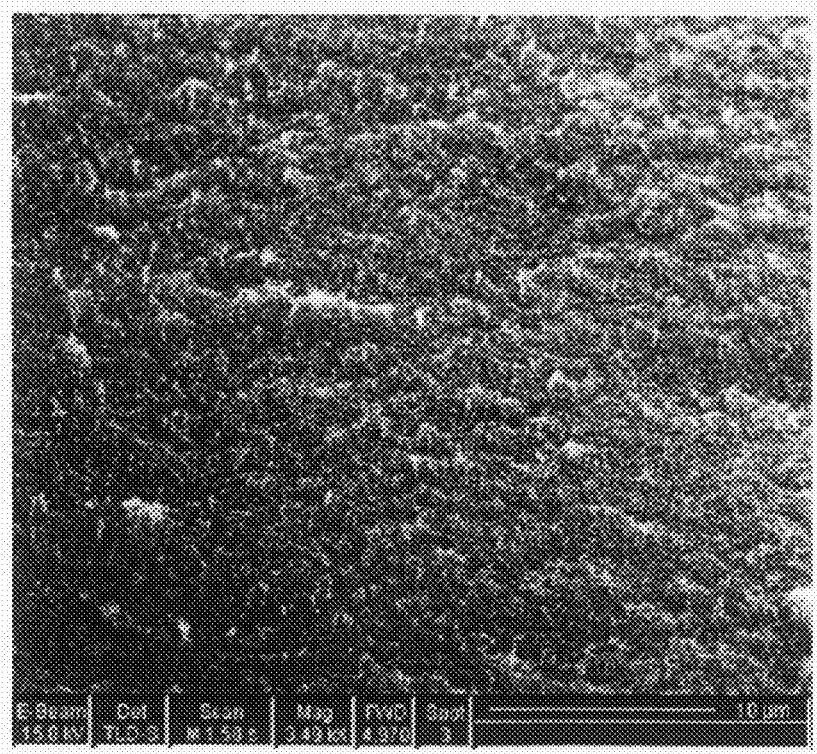
Figure 16A:
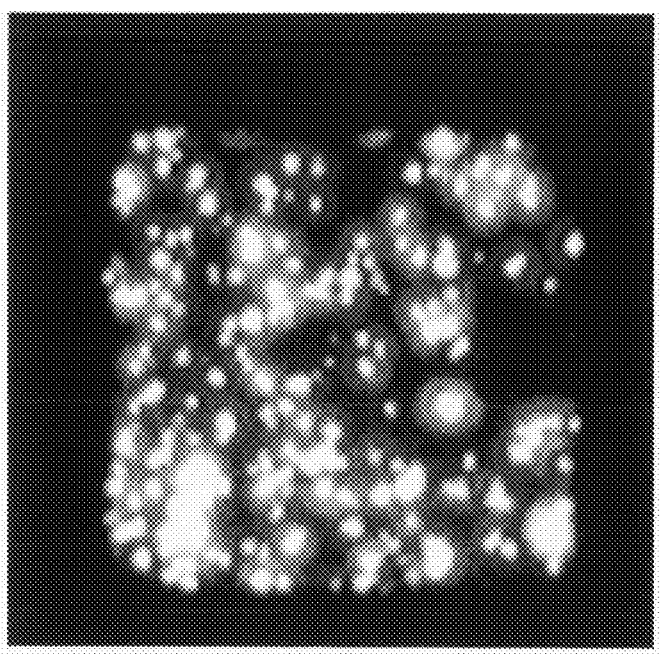
FIG. 16 illustrates a comparison of emission patterns showing an increase in both the number of emission sites and in emission current density achieved in CNT mat cathodes after UV laser irradiation in accordance with yet another embodiment.
Figure 16B:
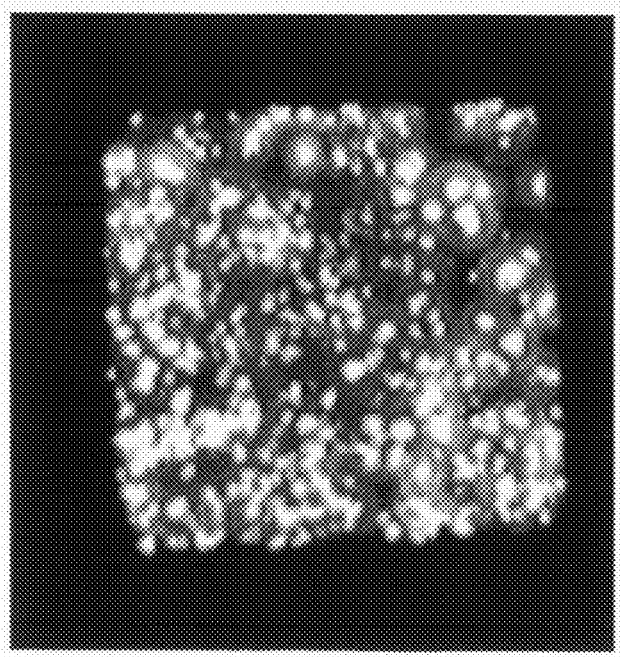
Figure 17:
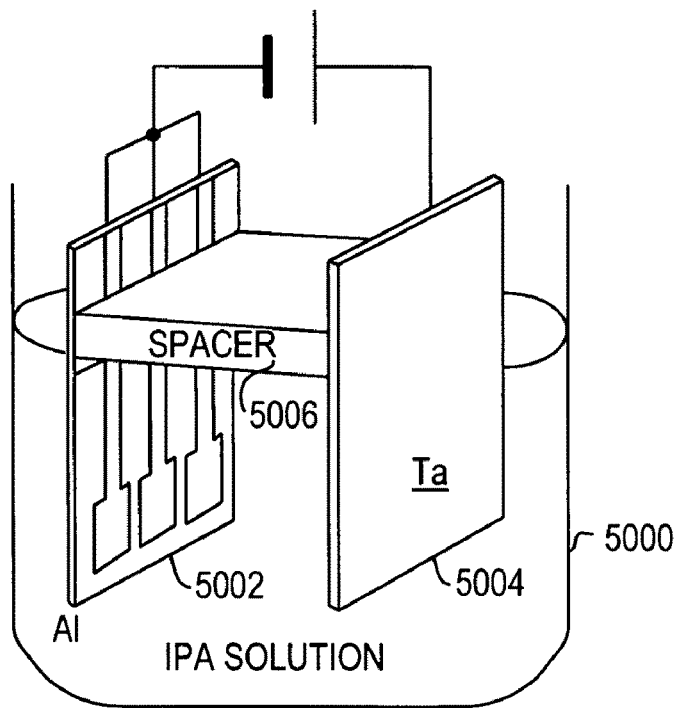
FIG. 17 illustrates an electrophoresis bath used to fabricate a carbon nanotube film (electrode).
Figure 18:
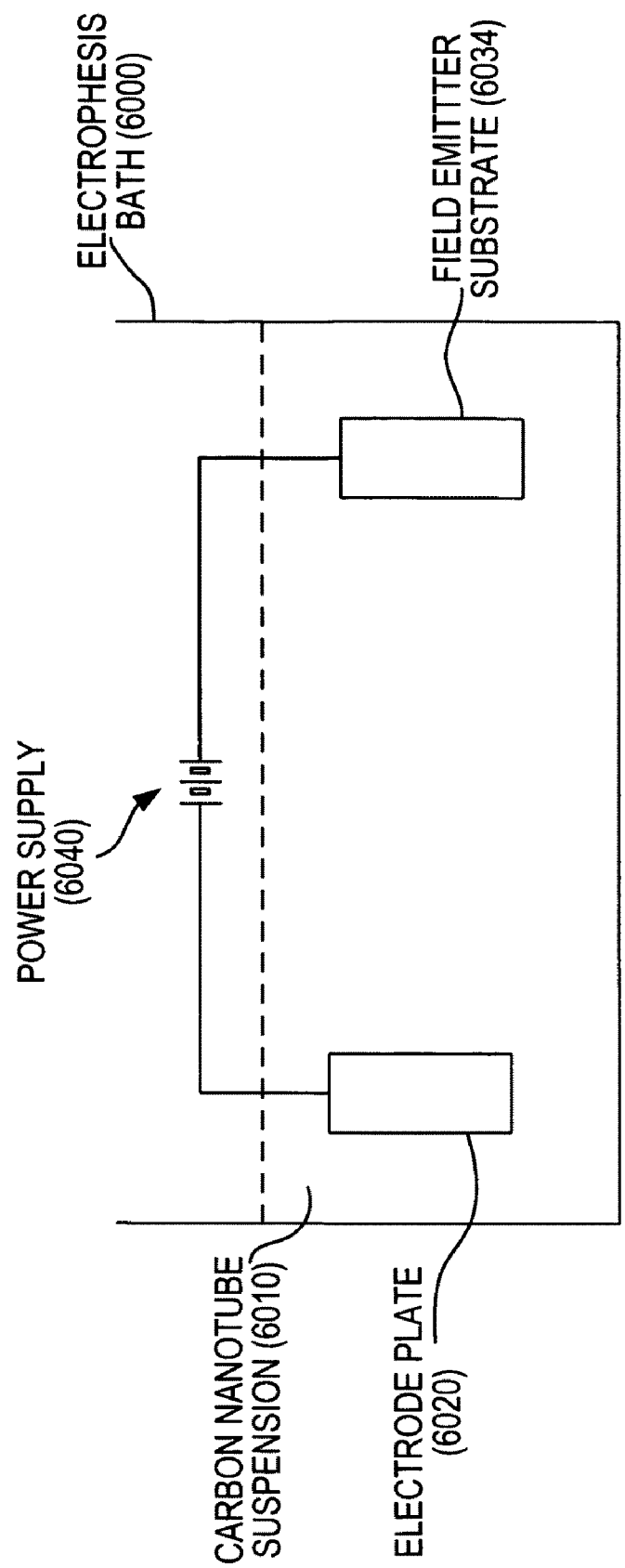
FIG. 18 illustrates another electrophoresis bath used to fabricate a carbon nanotube film (electrode).

FIG. 14 shows the emission current density as a function of electric field for CNT mat and screen-printed CNT emitters before and after UV laser irradiation in air. With an applied electric field of 3.47 V/µm, the emission current density of the top and bottom surfaces of CNT mat are 1.99 and 0.03 mA/cm2, and for the screen-printed CNT emitters, no emission was observed with the same electric field. After UV laser irradiation, the emission current density changed to 1.52 and 6.76 mA/cm$^2$ for the top and bottom surfaces of CNT mat, and the emission current density of screen-printed CNT emitters increased to 0.33 mA/cm2. As shown in the SEM photomicrographs of CNT mat in FIG. 15, the morphologies of the two surfaces are quite different. FIG. 16 shows that the emission uniformity was also improved after UV laser irradiation. To put this data into perspective, it should be noted that the electron emission behavior of CNT mat without any surface treatment is similar to that of the screen-printed CNT cathodes after laser irradiation.

Example 3

CNT Cathodes

Figure 3:
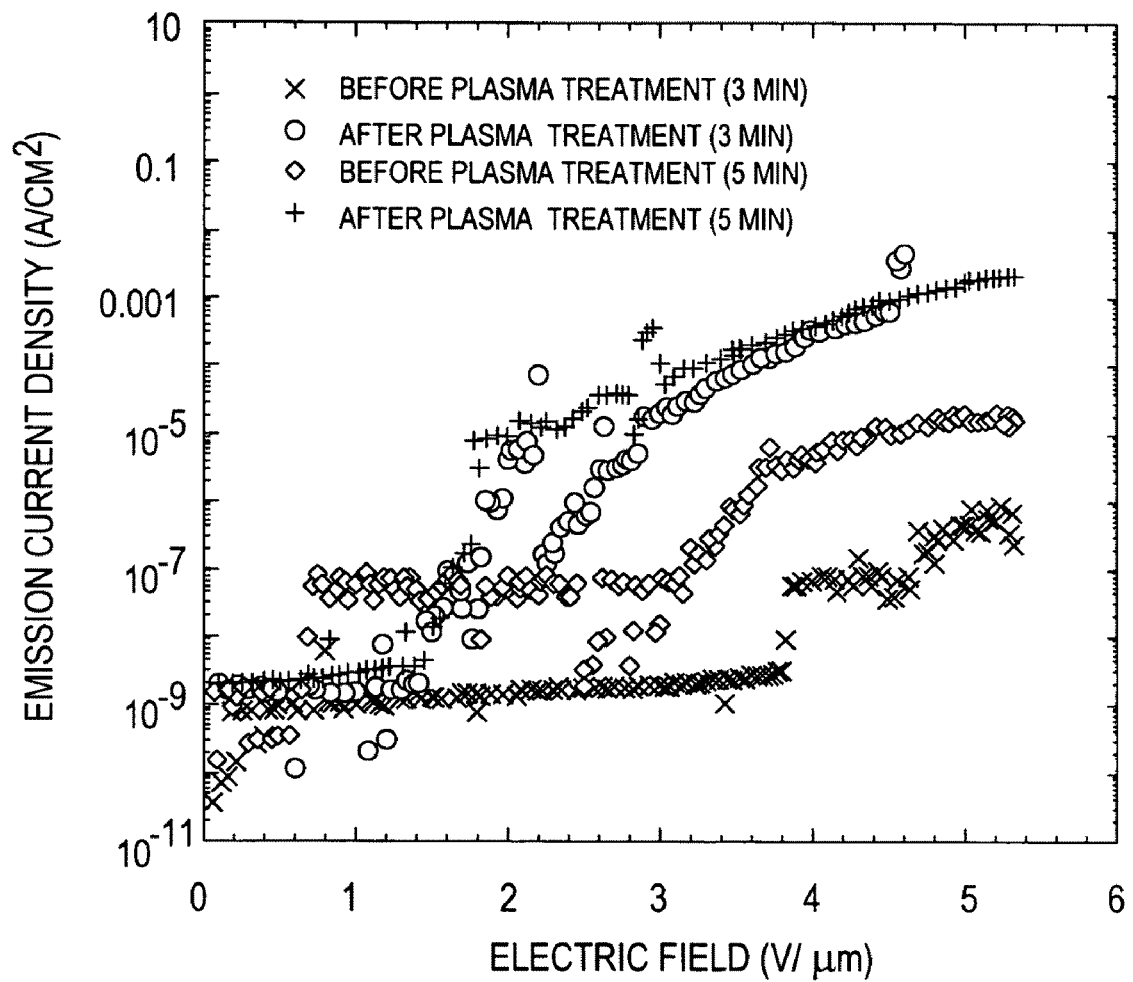
FIG. 3 is a comparative plot of emission current density vs. electric field (I-V characteristics) for screen printed carbon nanotube cathodes with and without argon plasma treatment in accordance with an embodiment.
Figure 4:
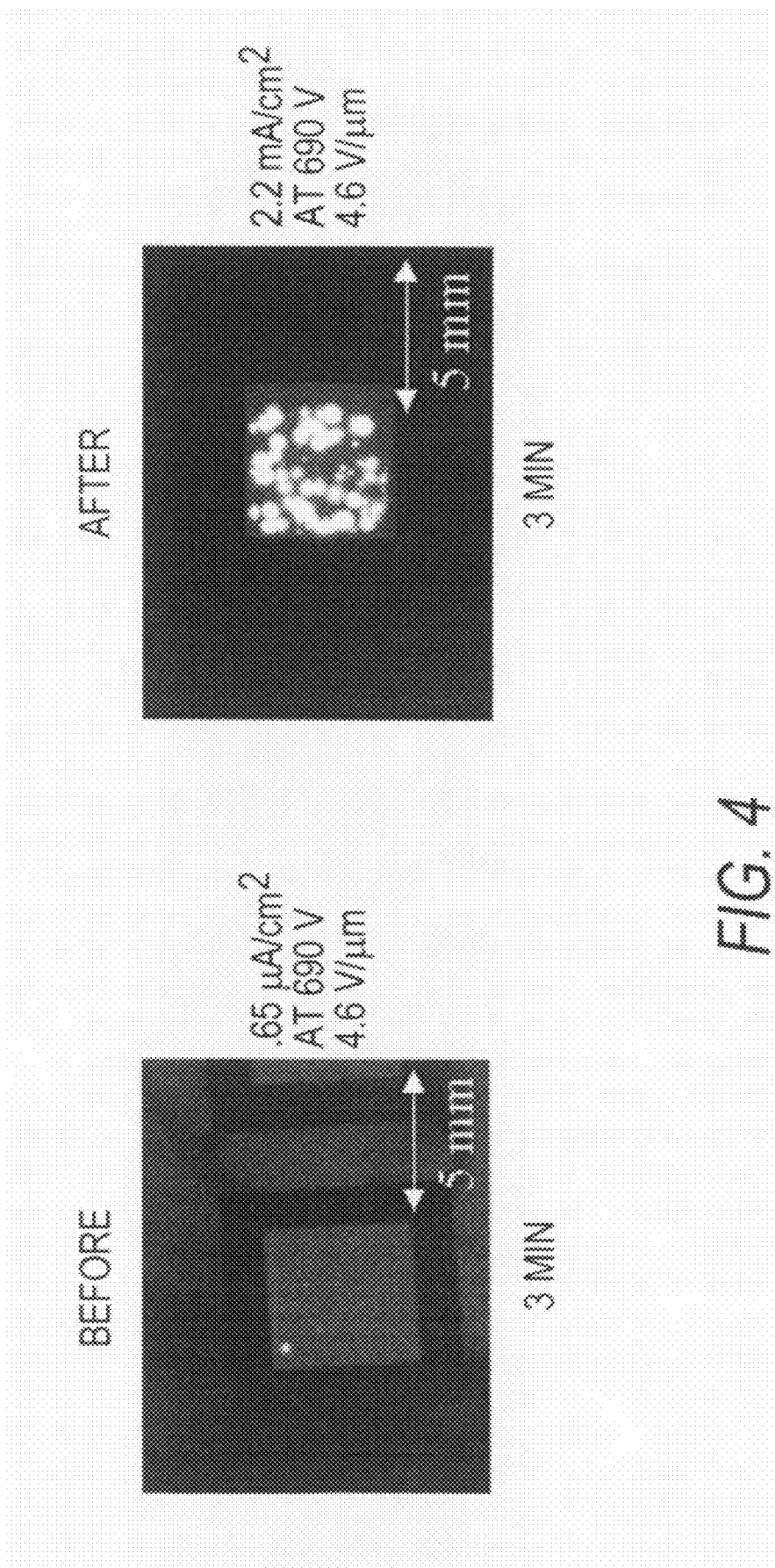
FIG. 4 illustrates a comparison of emission patterns showing an increase in both the number of emission sites and in emission current density achieved through argon plasma treatment in accordance with an embodiment.
Figure 5:
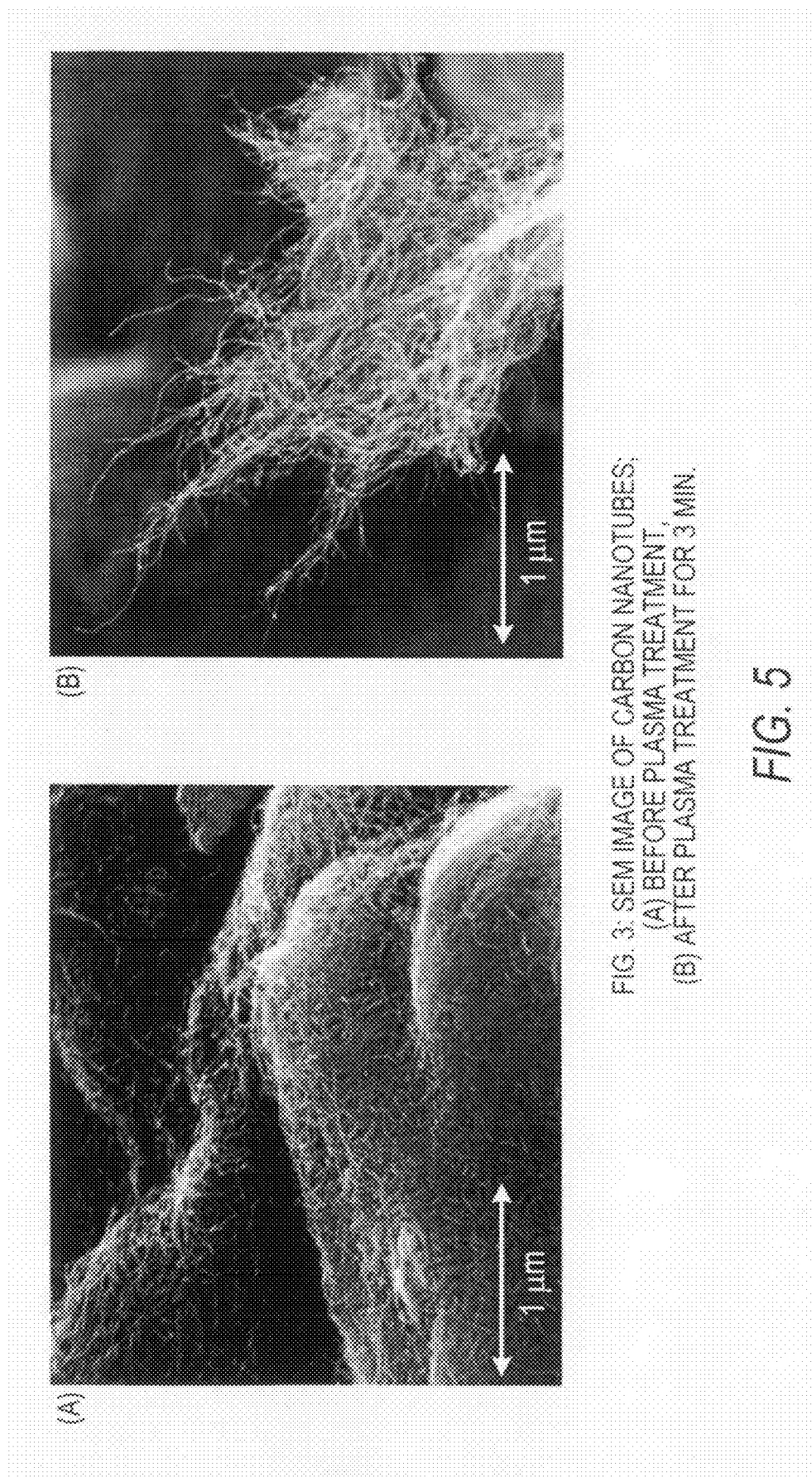
FIG. 5 is a comparison between SEM micrographs of the morphology of carbon nanotubes before and after plasma treatment indicated a change in orientation in accordance with a further embodiment.

As shown in FIGS. 3, 4, and 5, the emission characteristics from carbon nanotube (CNT) cathodes made by screen printing on a glass substrate were measured after aging in an ultra high vacuum chamber (5.3×10$^{-8}$ Pa). CNT cathodes on the glass substrate were exposed to argon (Ar) plasma with a discharge voltage of 250 V and a vacuum of 40 Pa. The plasma exposure time was varied in following times (30 s, 1 min, 2 min, 3 min, 4 min and 5 min). The emission characteristics from CNT cathodes were measured in an ultra high vacuum chamber. FIG. 3 shows I-V characteristics of CNT cathodes before and after plasma treatment for 3 min. The emission current increased after an Ar plasma treatment for 3 min by three orders of magnitude from 9.0×10$^{-5}$ to 0.3 mA/cm$^2$ at 4 V/µm field with a decrease in turn-on voltage from 3.3 V/µm to 1.7 V/µm. FIG. 4 shows electron emission patterns at 4.6 V/µm; (a) before plasma treatment; (b) after plasma treatment for 3 min. This clearly indicates an increase in the number and the strength of the emission sites after plasma treatment. These results indicate that the emission characteristics were significantly improved by plasma treatment. FIG. 5 shows the CNT images using scanning electron microscopy (SEM) before and after plasma treatment. CNT bundles that are tangled together after screen printing were somewhat unraveled, leading to a degree of orientation perpendicular to the cathode surface Ar plasma treatment. Not to be bound by a particular theory, it is believed that this orientation effect observable with the CNT after plasma treatment contributes to the enhanced electron emission after plasma treatment.

No experiments have been performed to date investigating the effects of plasma treatment on nanotube mat cathodes. Recalling the emission results shown in FIG. 2 in comparing untreated screen printed electrodes with untreated mat electrodes, it is anticipated that plasma treated mat electrodes will yield an improved cathode.

Example 4

Carbon Nanotube Ink

A carbon nanotube containing ink (sample 296-47-02) was prepared as follows. The polymeric binder and liquid vehicle were first prepared by mixing 9.5 grams of VAGH (DOW Hydroxyl-Modified Vinyl Copolymer) with 100 grams of γ butyrolactone on a hot plate with a stir bar at 60° C. until the binder had completely dissolved. After dissolution of the VAGH, a clear light yellow solution was obtained. 1 gram of Triton-X surfactant was added to the solution and agitated to dissolve. 2.0 grams of dry carbon fibrils were added and the mixture was sonicated with a probe Branson sonicator at 450 W. The sonication continued until a gel-like slurry was obtained. A three roll mill was then used to mill the ink to a uniform, viscous ink. The ink was processed through 4 passes through the three roll mill and the ink was finally filtered through a 500 mesh stainless steel filter screen.

Example 5

Carbon Nanotube Ink with Plasma Treatment

The emission characteristics from carbon nanotube (CNT) cathodes made by screen printing a carbon nanotube ink on a glass substrate were measured after aging in an ultra high vacuum chamber ($5.3\times10^{-8}$ Pa). CNT cathodes on the glass substrate were exposed to argon (Ar) plasma with a discharge voltage of 250 V and a vacuum of 40 Pa. The plasma exposure time was varied in following times (30 s, 1 min, 2 min, 3 min, 4 min and 5 min). The emission characteristics from CNT cathodes were measured in an ultra high vacuum chamber. The emission current increased after an Ar plasma treatment for 3 min by three orders of magnitude from $9.0\times10^{-5}$ to 0.3 mA/cm$^2$ at 4 V/μm field with a decrease in turn-on voltage from 3.3 V/μm to 1.7 V/μm. The electron emission patterns at 4.6 V/μm; before and after plasma treatment for 3 min. clearly indicate an increase in the number and the strength of the emission sites after plasma treatment. Scanning electron microscopy (SEM) images of the cathode surface before and after plasma treatment were recorded. These images show that bundles that are tangled together after screen printing were somewhat unraveled, leading to a degree of orientation perpendicular to the cathode after surface Ar plasma treatment. Not to be bound by a particular theory, it is believed that this orientation effect observable with the CNT after plasma treatment contributes to the enhanced electron emission after plasma treatment. These results indicate that the emission characteristics were significantly improved by plasma treatment.

Example 6

Cathode Prepared from Carbon Nanotube Ink Treated with Laser Irradiation

The emission characteristics from carbon nanotube (CNT) cathodes made by screen printing a carbon nanotube ink on a glass substrate were measured before and after treatment with a UV laser. UV laser light with wavelength of 349 and 266 nm from a tunable laser were used to irradiate CNT samples in air and in a vacuum chamber (pressure: $1\times10^{-5}$ pa) for 1 minute at an average energy density of 20.3, 10.2 and 2.25 mJ/cm$^2$ respectively, corresponding to an elliptic beam spot size of 4.9, 9.8 and 44.4 mm$^2$. The repetition frequency of the laser is 10 Hz, with a pulse duration of 5 ns. A diode structure (anode area: 5×5 mm$^2$) with a spacer of 125 mm was used to measure the emission current. The electron emission pattern was observed through a phosphor screen on the ITO anode. The emission characteristics of CNT samples irradiated in air by both of the 349 and 266 nm UV laser with an average irradiation energy density of 20.3 and 10.2 mJ/cm$^2$ were drastically improved after laser irradiation. For example, the emission current densities were increased from 8.9 to 259.4 mA/cm$^2$, and the turn-on electric field were decreased from 3.6 to 2.9 V/micron.

One skilled in the art will appreciate further features and advantages of the invention based on the above-described embodiments. Accordingly, the invention is not to be limited by what has been particularly shown and described, except as indicated by the following appended claims.

All of the references listed below are hereby incorporated by reference:

BIBLIOGRAPHY

Use of Carbon Nanotubes in Field Emission Cathodes for Light Sources
PCT Appln. PCT/SE00/015221—A Light Source, and a Field Emission Cathode Other Uses
PCT Appln. PCT/US99/13648—Free-Standing and Aligned Carbon Nanotubes and Synthesis Thereof (scanning electron microscope, alkali metal batteries, electromagnetic interference shield, and microelectrodes).

Further Description
Yahachi Saito et al., Cathode Ray Tube Lighting Elements with Carbon Nanotube Field Emitters, 37 JAPAN. J. APPLIED PHYSICS 346 (1998).
Yahachi Saito et al., Field Emission from Multi-Walled Carbon Nanotubes and its Application to Electron Tubes, 67 APPLIED PHYSICS 95, (1998).
J. D. Carey et al., Origin of Electric Field Enhancement in Field Emission from Amorphous Carbon Thin Films, 78 APPLIED PHYSICS LETTERS 2339 (2001).
Kenneth A. Dean et al., Current Saturation Mechanisms in Carbon Nanotube Field Emitters, 76 APPLIED PHYSICS LETTERS 375 (2000).
W. Zhu et al., Low-Field Electron Emission from Undoped Nanostructured Diamond, 282 SCIENCE 1471 (1998).
L. Nilsson et al., Carbon Nano-/Micro-Structures in Field Emission: Environmental Stability and Field Enhancement Distribution, 383 THIN SOLID FILMS 78 (2001).
K. C. Walter et al., Improved Field Emission of Electrons from Ion Irradiated Carbon, 71 APPLIED PHYSICS LETTERS 1320 (1997)

S. Dimitrijevic et al., Electron Emission From Films of Carbon Nanotubes and ta-C Coated Nanotubes, 75 APPLIED PHYSICS LETTERS 2680 (1999)

A. Wadhawan et al., Effects of Cs Deposition on the Field-Emission Properties of Single-Walled Carbon-Nanotube Bundles, 78 APPLIED PHYSICS LETTERS 108 (2001)

O. Yavas et al., Improvement of Electron Emission of Silicon Field Emitter Arrays by Pulsed Laser Cleaning, 18 J. VAC. SCI. TECHNOL. B. 1081 (2000)

O. Yavas, et al., Laser Cleaning of Field Emitter Arrays for Enhanced Electron Emission, 72 APPLIED PHYSICS LETTERS 2797 (1998)

M. Takai et al., Effect of Laser Irradiation on Electron Emission from Si Field Emitter Arrays, 16 J. VAC. SCI. TECHNOL. B. 780 (1998)

M. Takai et al., Electron Emission from Gated Silicide Field Emitter Arrays, 16 J. VAC. SCI. TECHNOL. B. 790 (1998).]

R. Khan et al. Electron Delocalization in Amorphous Carbon by Ion Implantation, 63 PHYSICAL REVIEW B 121201-1 (2001)

M. Takai et al., Effect of Gas Ambient on Improvement in Emission Behavior of Si Field Emitter Arrays, 16 J. VAC. SCI. TECHNOL. 799 (1998).

O. Yavas et al., Field Emitter Array Fabricated Using Focused Ion and Electron Beam Induced Reaction, 18 J. VAC. SCI. TECHNOL. 976 (2000)

O. Yavas et al., Maskless Fabrication of Field-Emitter Array by Focused Ion and Electron Beam, 76 APPLIED PHYSICS LETTERS 3319 (2000)

A. Seidl et al., Geometry Effects Arising from Anodization of Field Emitters, 18 J. VAC. SCI. TECHNOL. B 929 (2000).

O. Yavas et al., Pulsed Laser Deposition of Diamond Like Carbon Films on Gated Si Field Emitter Arrays for Improved Electron Emission, 38 JAPAN. J. APPLIED PHYSICS 7208 (1999).

Methods of Oxidizing carbon nanotubes are described in: U.S. application Ser. No. 10/041,165 filed Jan. 8, 2002 (2138), U.S. Pat. No. 5,965,470 (2140), U.S. Pat. No. 6,099,965 (3480), U.S. Pat. No. 5,853,877 (3660), U.S. application Ser. No. 09/500,740 filed Feb. 9, 2000 (3493), U.S. application Ser. No. 09/358,745 filed Jul. 21, 1999 (4070) and U.S. application Ser. No. 10/005,586 filed Oct. 29, 2001

Formation of nanotube mats is described in U.S. Pat. No. 5,691,054 (3130), U.S. Pat. No. 5,846,658 (3140), U.S. Pat. No. 6,099,965 (3480), U.S. application Ser. No. 09/500,740 filed Feb. 9, 2000 (3493), U.S. Pat. No. 6,031,711 (3600), U.S. Pat. No. 6,099,960 (3630), U.S. Pat. No. 6,205,016 (3760), U.S. Pat. No. 5,800,706 (3510), U.S. Pat. No. 5,985,112 (3890)

Production of SWTs is described in U.S. Pat. No. 6,221,330 (3830)

Plasma treatment is described in U.S. application Ser. No. 08/715,027 filed Sep. 17, 1996

Combinations of PVDF and nanotubes are described in U.S. application Ser. No. 09/903,189 filed Jul. 11, 2001 and U.S. application Ser. No. 09/988,973 filed Nov. 20, 2001

Fibril aggregates are described in U.S. Pat. No. 5,456,897 (2260)

Cathodes comprising carbon nanotubes are described in U.S. application Ser. No. 10/171,760 filed Jun. 14, 2002

Nanotube inks are described in a PCT Application entitled Electroconductive Carbon Fibril based Inks and Coatings, Ser. No PCT/US03/19068, filed Jun. 16, 2003

What is claimed is:

1. A field emission device comprising:
an anode; and
a cathode comprising a carbon nanotube mat; wherein the carbon nanotube mat consists essentially of carbon nanotubes and is produced from a filter cake formed by filtering a plurality of nanotubes from a liquid suspension,
and wherein the plurality of nanotubes are substantially cylindrical having one or more graphitic layers concentric with their cylindrical axes, the nanotubes being substantially free of pyrolytically deposited carbon overcoat, having a substantially uniform diameter between 0.4 nm and 100 nm and having a length to diameter ratio greater than 5.

2. The carbon nanotubes mat according to claim 1 comprising:
a top surface which is the emitting surface of the cathode; and
a bottom surface which was adjacent to the filter during the forming of the mat.

3. A device according to claim 1, wherein the plurality of nanotubes have a diameter less than about one micron.

4. A device according to claim 1, wherein the plurality of nanotubes have a morphology resembling a fishbone.

5. A device according to claim 1, wherein the plurality of nanotubes have a single wall.

6. A device according to claim 1, wherein the plurality of nanotubes are oxidized.

7. A device according to claim 6, wherein the nanotubes are crosslinked.

8. A device according to claim 1, wherein the filter cake is formed in the presence of a binder.

9. A device according to claim 8, wherein the binder is a solvent soluble fluoropolymer.

10. A device according to claim 9, wherein the binder is PVDF.

11. The field emission device of claim 1, wherein the nanotubes comprise surface-modified nanotubes.

12. A field emission cathode comprising:
a carbon nanotube mat; wherein the carbon nanotube mat consists essentially of carbon nanotubes and is produced from a filter cake formed by filtering a plurality of nanotubes from a liquid suspension, and wherein the plurality of nanotubes are substantially cylindrical having one or more graphitic layers concentric with their cylindrical axes, the nanotubes being substantially free of pyrolytically deposited carbon overcoat, having a substantially uniform diameter between 0.4 nm and 100 nm and having a length to diameter ratio greater than 5.

13. The carbon nanotubes mat according to claim 12, comprising:
a top surface which is the emitting surface of the cathode; and
a bottom surface which was adjacent to the filter during the forming of the mat.

14. The field emission cathode of claim 12, wherein the nanotubes comprise surface-modified nanotubes.

* * * * *